(12) United States Patent
Hayashi

(10) Patent No.: US 6,540,361 B1
(45) Date of Patent: Apr. 1, 2003

(54) DISPLAY OPTICAL APPARATUS

(75) Inventor: Kohtaro Hayashi, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 330 days.

(21) Appl. No.: 09/583,684

(22) Filed: May 31, 2000

(65) Prior Publication Data (65)

(30) Foreign Application Priority Data

Jun. 3, 1999 (JP) .......................... 11-155991
Sep. 21, 1999 (JP) .......................... 11-266452

(51) Int. Cl.⁷ .......................... G03B 21/100
(52) U.S. Cl. .................. 353/31; 353/30; 353/34; 349/64; 349/95; 345/108
(58) Field of Search .................. 353/20, 30, 31, 353/32, 34, 38; 349/108, 109, 64, 95; 348/742, 743, 771; 359/495, 494, 566, 626; 345/108

(56) References Cited

U.S. PATENT DOCUMENTS

| | | | |
|---|---|---|---|
| 5,161,042 A | 11/1992 | Hamada | 359/41 |
| 5,623,349 A | 4/1997 | Clarke | 349/8 |
| 5,633,737 A | 5/1997 | Tanaka et al. | 349/95 |
| 5,757,341 A | 5/1998 | Clarke et al. | 345/32 |
| 6,304,381 B1 * | 10/2001 | Hayashi | 349/64 |
| 6,320,628 B1 * | 11/2001 | Tsujikawa et al. | 348/751 |

FOREIGN PATENT DOCUMENTS

JP 09-318904 A 12/1997

* cited by examiner

Primary Examiner—Russell Adams
Assistant Examiner—Michelle Nguyen
(74) Attorney, Agent, or Firm—Sidley Austin Brown & Wood LLP

(57) ABSTRACT

A display optical apparatus has an illumination optical system, a light modulating device, a projection optical system, and pixel shifting means. The illumination optical system includes a color separator, and emits, as illumination light, light polarized uniformly in a predetermined polarization direction after separating it by the color separator in such a way that light components of different wavelength ranges travel in different directions. The light modulating device has a display surface on which an optical image to be illuminated with the illumination light is displayed, and has, on the display surface, pixels corresponding to three primary colors, namely R, G, and B, arranged in a recurring pattern. The projection optical system focuses projection light exiting from the light modulating device on an image plane. The pixel shifting means shifts the projection light focused on the image plane by a predetermined number of pixels at a time. The illumination light is composed of light beams of three primary colors, namely R, G, and B, arranged in a recurring pattern, and light beams of identical colors illuminate a plurality of adjacent pixels of corresponding colors on the display surface of the light modulating device.

28 Claims, 31 Drawing Sheets

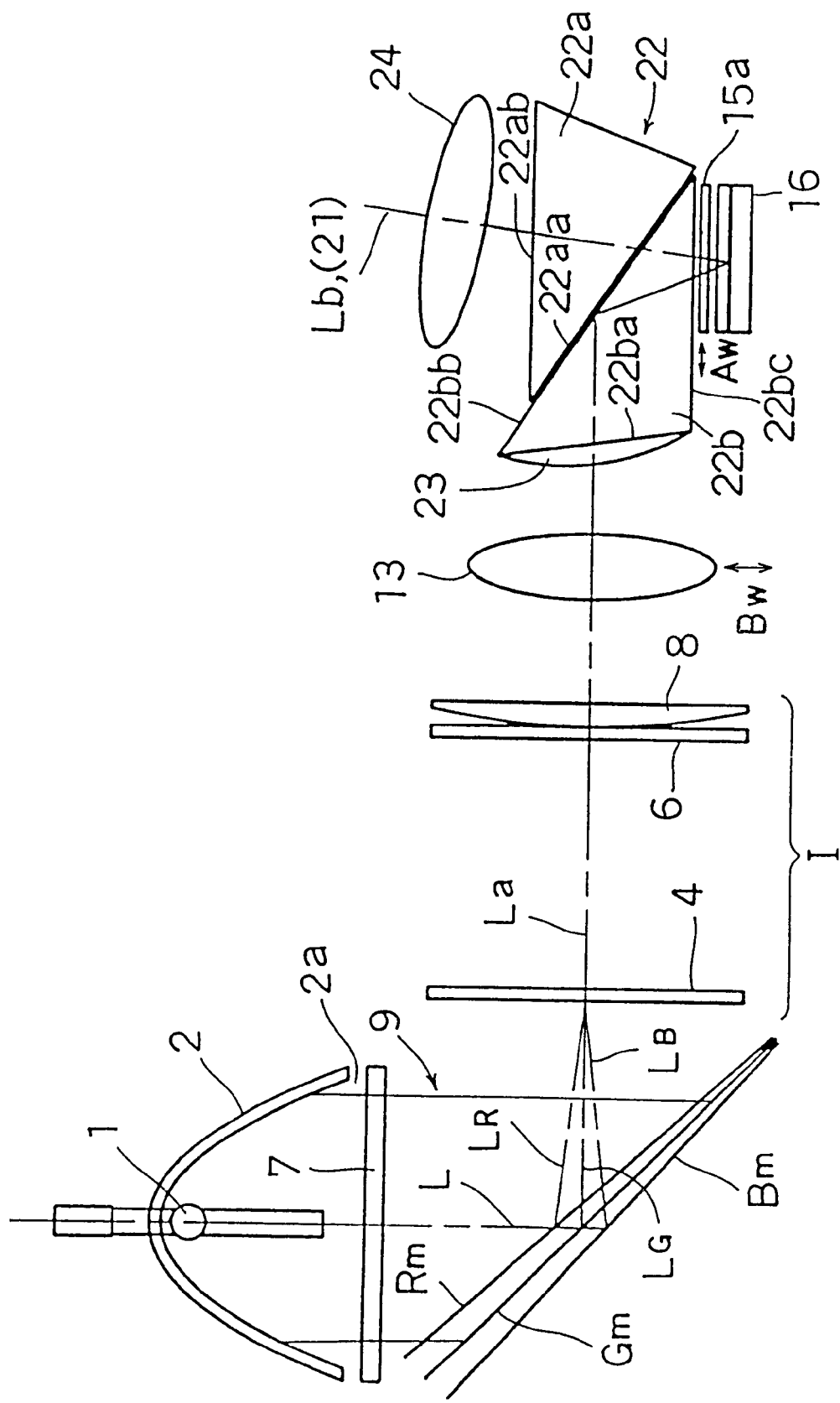

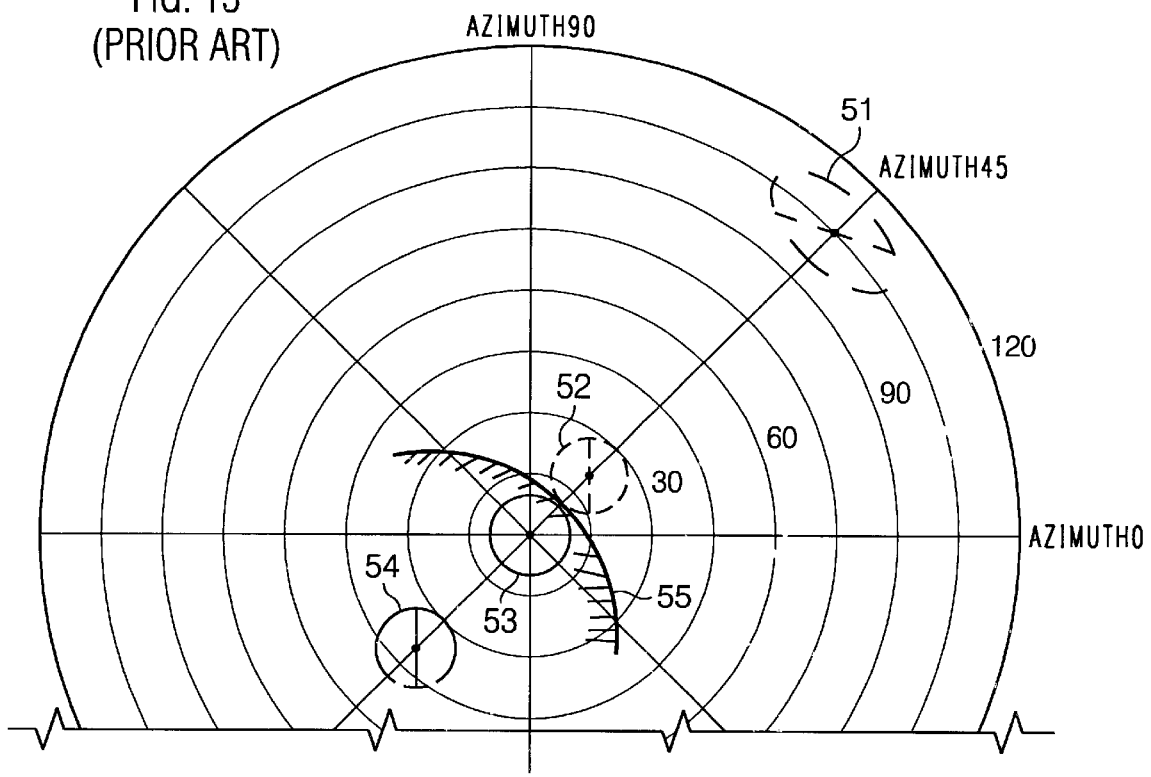

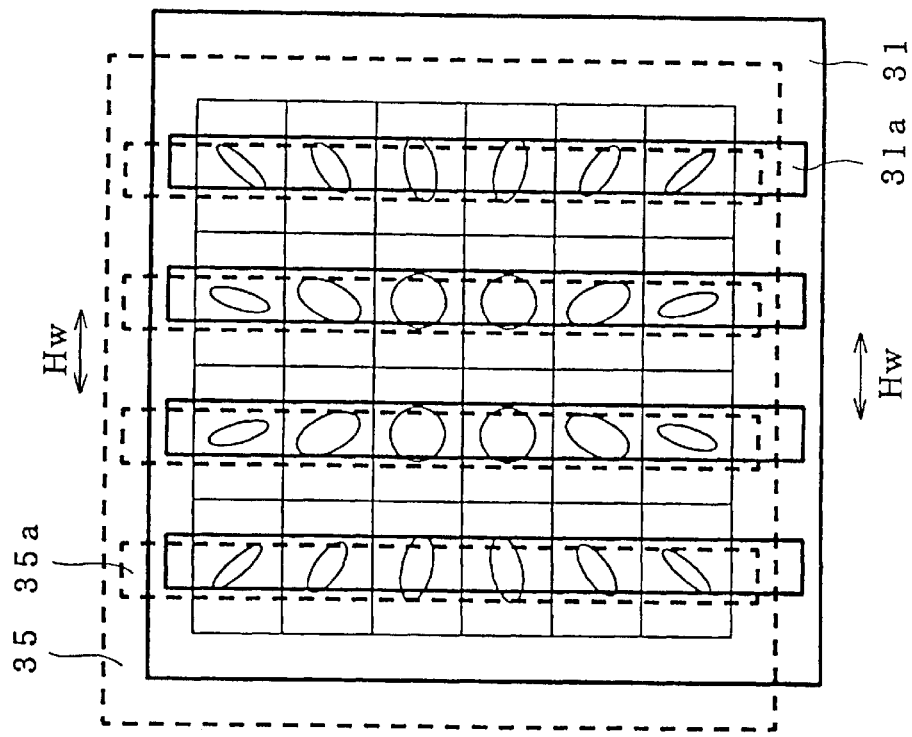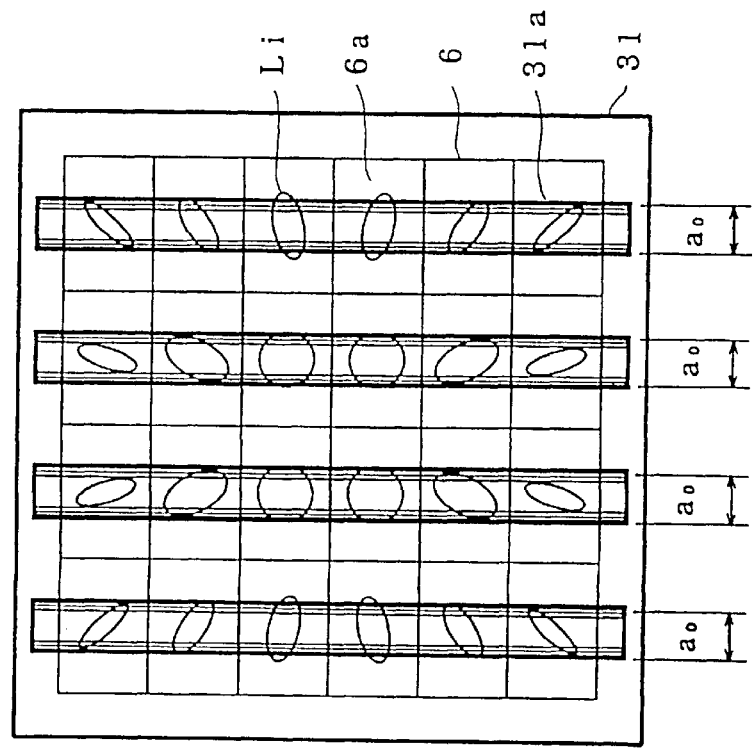

DISPLAY OPTICAL APPARATUS

This application is based on applications Nos. H11-155991 and H11-266452 filed in Japan on Jun. 3, 1999 and Sep. 21, 1999, respectively, the entire content of which is hereby incorporated by reference.

BACKGROUND OF THE INVENTION

1. Field of the Invention

The present invention relates to a display optical apparatus for projecting an image formed on a reflection-type display panel.

2. Description of the Prior Art

One of conventional means of displaying an image is a projection-type display optical apparatus. Today, in a display optical apparatus of this type, a so-called reflection-type display panel such as a reflection-type liquid crystal display panel is employed. In addition, an illumination optical system is employed to illuminate efficiently and uniformly an optical image displayed on such a reflection-type display panel. Moreover, a microlens array or the like is disposed immediately in front of the reflection-type display panel to direct the illumination light emitted from the illumination optical system to the reflection-type display panel.

For example, in a so-called single-panel construction, a reflection-type display panel is used that has R, G, and B pixels arranged in a recurring pattern. Illumination light is separated into R, G, and B light beforehand, and the thus separated R, G, and B light is directed at different angles into individual microlenses of a microlens array, separately for each pixel group (here, a pixel group denotes a set of three different, i.e. R, G, and B, pixels) or for every predetermined number of pixel groups, so that the R, G, and B light is condensed individually onto the R, G, and B pixels of the reflection-type display panel.

FIG. 22 is a diagram schematically showing a conventional example of the relationship between a microlens array and a display panel. This arrangement is adopted in a single-panel-type projector optical system that employs as its display panel a transmission-type liquid crystal display panel, such as the one disclosed in U.S. Pat. No. 5,161,042. Here, where a single-panel construction is adopted, a display panel 16 is used that has R, G, and B pixels arranged in a recurring pattern. The light 9 from a light source 1 (described later) is separated into R, G, and B light beforehand, and the thus separated R, G, and B light is directed at different angles into individual microlenses 61a of a microlens array 61, separately for each pixel group, so that the R, G, and B light is condensed individually onto the R, G, and B pixels of the display panel 16. This helps achieve efficient illumination. It is to be noted that this figure shows only parts of the microlens array 61 and the display panel 16, i.e. the remaining parts thereof extending further rightward and leftward are omitted.

FIG. 23 is a diagram schematically showing another example of the relationship between a microlens array and a display panel disclosed in Japanese Patent Application Laid-Open No. H9-318904. Here, as shown in the figure, for each of the microlenses 62a of a microlens array 62, the light 9 from a light source 1 is separated not simply into R, G, and B light but into light beams corresponding to a plurality of pixel groups, arranged in the order RGBRGB . . . , before being shone thereon, so that the thus separated light beams are condensed individually onto the R, G, and B pixels of the display panel 16. It is to be noted that this figure shows only parts of the microlens array 62 and the display panel 16, i.e. the remaining parts thereof extending further rightward and leftward are omitted.

Even in a single-panel construction employing a display panel having R, G, and B pixels arranged in a recurring pattern as described above, it is desirable to achieve color display with resolution equivalent to that achieved in a so-called three-panel construction without increasing the total number of pixels. To achieve this, it is customary to adopt so-called color pixel time division whereby one screen is displayed in three cycles, with R, G, and B light focused in slightly shifted positions in each cycle, that are chronologically superimposed on one another.

However, in the arrangement shown in FIG. 22 as a conventional example, since a modern liquid crystal display panel used as the display panel there typically has a fine pixel pitch, it is not possible to achieve efficient illumination without making the distance from the microlenses 61a to the individual pixels of the display panel 16 extremely short. This makes it practically impossible to adopt this arrangement. Specifically, to obtain sufficiently high resolution, a modern liquid crystal display panel has a pixel pitch in the range from 10 to 20 μm.

Where, as with the microlens array 61 of this conventional example, each pixel of the display panel 16 is illuminated with three light beams, i.e. one for each of R, G, and B light, the distance from the microlenses 61a to the individual pixels of the display panel 16 needs to be less than 100 μm, and this makes it practically impossible to produce them; even if it is possible to produce them, the microlenses then have so sharp a curvature that it is impossible to achieve proper illumination because of aberrations and the like.

These problems can be effectively overcome by the arrangement shown in FIG. 23 as another conventional example. However, in this arrangement, the intervals between the light beams separated according to color are determined beforehand by a single-stage integrator realized by the use of a lens array (not shown here). Therefore, to achieve uniform illumination over a comparatively long span, as from the center to the edge of the screen, the lens array needs to be divided considerably finely; for example, even along the longer sides thereof, along which it is divided more roughly, it needs-to be divided into 4 to 7 sections or more. Thus, in this arrangement, as opposed to the arrangement described previously, the microlenses 62a need to be located far away from the individual pixels of the display panel 16. This makes the f/number of the individual microlenses 62a darker than the diffraction limit, and thus the microlenses 62a do not condense light properly.

Specifically, when the light 9 from the light source 1 is divided beforehand finely into light beams arranged in the order RGBRGB . . . by means of an integrator realized by the use of a lens array, whereas the distance from the microlenses 62a to the individual pixels of the display panel 16 is long, i.e. in the range from 500 to 800 μm, the f/number of the individual microlenses 62a is darker than f/20, and thus the amount of diffraction-induced blurring (1.22×the wavelength λ×the f/number) occurring in the image formed is of the order of 10 to 20 μm, i.e. falls within the same range as the pixel pitch. As a result, practically, the finely divide R, G, and B light beams strike outside the individual pixels on the pixel surface. This degrades color purity and greatly reduces illumination efficiency.

Moreover, in general, placing a microlens array having microlenses arranged one for each pixel group immediately in front of a display panel makes the f/number of the microlenses dark, and thus causes more light to be diffracted so as to contribute to the blurring of the image formed than is focused on the pixels to form the image. Thus, this leads to rather inefficient illumination. On the other hand, with a microlens array having microlenses arranged one for every predetermined number of pixel groups (most of the embodiments described in Japanese Patent Application Laid-Open No. H9-318904 mentioned above are of this type), different light-source images are formed on nearby pixel groups, and thus the differences in brightness between different light-source images cause uneven illumination over a comparatively short span, as between adjacent pixel groups.

SUMMARY OF THE INVENTION

An object of the present invention is to provide a high-resolution display optical apparatus that achieves efficient illumination even with a display panel having a fine pixel pitch.

To achieve the above object, according to the present invention, a display optical apparatus is provided with an illumination optical system, including a color separator, for emitting, as illumination light, light polarized uniformly in a predetermined polarization direction after separating it by the color separator in such a way that light components of different wavelength ranges travel in different directions; a light modulating device having a display surface on which an optical image to be illuminated with the illumination light is displayed, and having, on the display surface, pixels corresponding to three primary colors, namely R, G, and B, arranged in a recurring pattern; a projection optical system for focusing projection light exiting from the light modulating device on an image plane; and pixel shifting means for shifting the projection light focused on the image plane by a predetermined number of pixels at a time. Here, the illumination light is composed of light beams of three primary colors, namely R, G, and B, arranged in a recurring pattern, and light beams of identical colors illuminate a plurality of adjacent pixels of corresponding colors on the display surface of the light modulating device.

BRIEF DESCRIPTION OF THE DRAWINGS

This and other objects and features of the present invention will become clear from the following description, taken in conjunction with the preferred embodiments with reference to the accompanying drawings in which:

FIG. 1 is a diagram schematically showing the construction of a display optical apparatus of a first embodiment of the invention;

FIG. 13 is a diagram showing the ranges of angles of the illumination and projection light in a conventional construction;

FIG. 30 is a diagram schematically showing the structure of a mask plate employing density filters;

FIG. 31 is a diagram schematically showing the structure of a mask plate with variable aperture width;

DESCRIPTION OF THE PREFERRED EMBODIMENTS

Figure 2A:
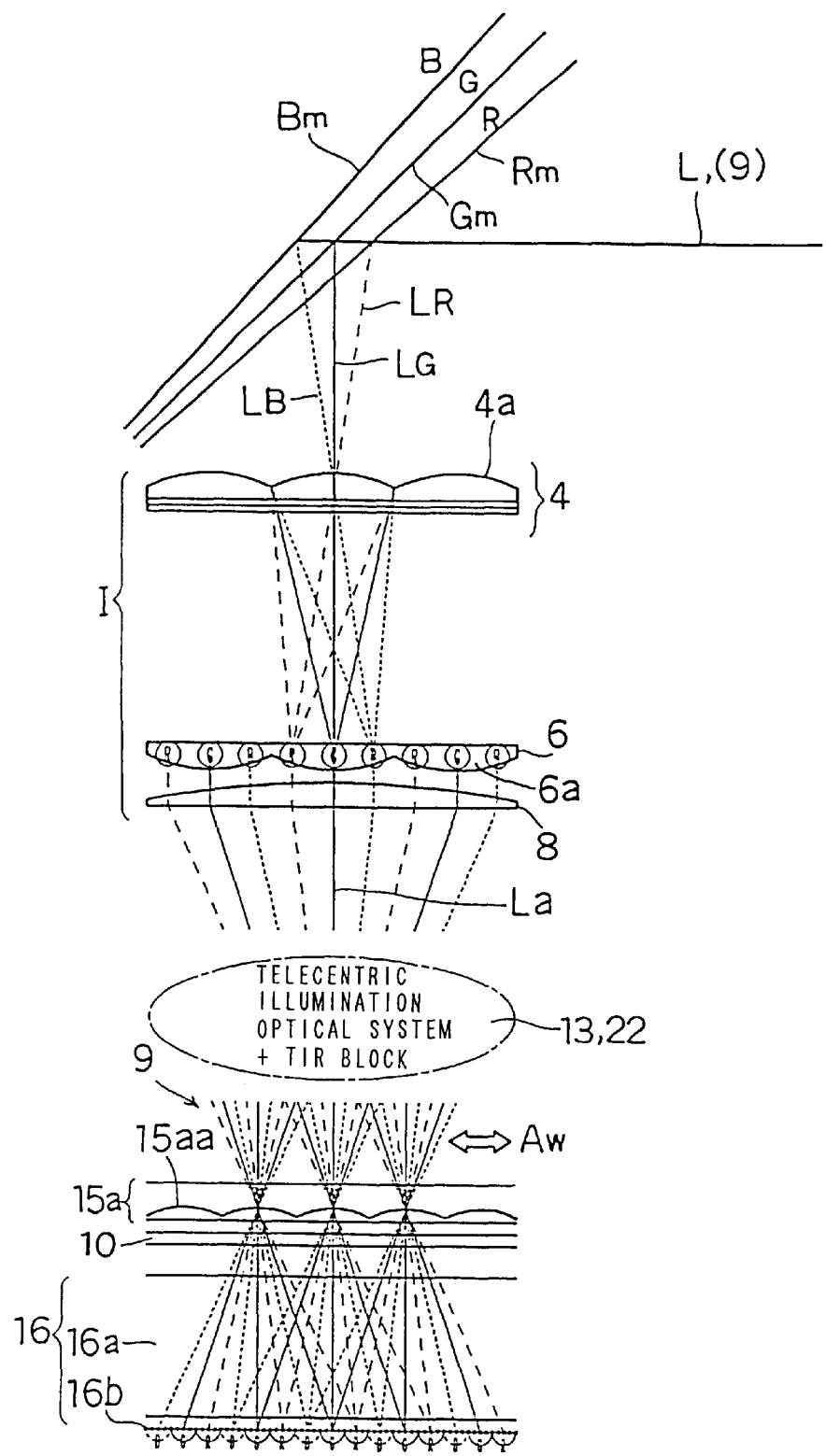
FIGS. 2A and 2B are enlarged views schematically showing a principal portion of the display optical apparatus of the first embodiment.

Hereinafter, embodiments of the present invention will be described with reference to the accompanying drawings. FIG. 1 is a diagram schematically showing the construction of the display optical apparatus of a first embodiment of the invention. It is to be noted that, in reality, the individual optical elements constituting it are arranged three-dimensionally but, in this figure, they are illustrated two-dimensionally for easier understanding. In the figure, reference numeral 1 represents a light source, and reference numeral 2 represents a reflector disposed so as to surround the light source 1. Reference numeral 7 represents a UV/IR cut filter disposed so as to cover the light exit opening 2a of the reflector 2 to cut the ultraviolet and infrared radiation included in the light emitted from the light source 1 and reflected from the reflector 2.

Behind the UV/IR cut filter 7 (i.e., in the figure, below it), dichroic mirrors $R_m$, $G_m$, and $B_m$, that reflect light of the frequency ranges corresponding to R (red), G (green), and B (blue), respectively, are disposed with different inclinations. The light 9 having passed through the UV/IR cut filter 7 along the optical axis L is reflected from the dichroic mirrors $R_m$, $G_m$, and $B_m$ individually so as to reach a first lens array 4 disposed further behind (i.e., in the figure, on the right) by traveling along differently inclined optical axes $L_R$, $L_G$, and $L_B$, respectively. Instead of the dichroic mirror $B_m$, it is also possible to use a total-reflection mirror. In the figure, the light 9 after being reflected from the dichroic mirrors is omitted.

Behind the first lens array 4 are disposed, somewhat away therefrom, a second lens array 6, and then immediately behind it, a superimposing lens 8. Though not shown here, the first lens array 4 has lens cells arranged in a grid-like formation, and the second lens array 6 has lens cells arranged in a grid-like formation that is different from that of the first lens array 4. The first lens array 4 has a birefringent diffraction grating, and performs polarization separation on the light 9 coming from the light source 1 and the reflector 2 to separate the light 9 in the direction of the shorter sides of the individual lens cells of the second lens array 6. The light 9 coming from the light source 1 and the reflector 2 is, while traveling through the first lens array 4 and the second lens array 6, subjected to polarization conversion and thereby formed into uniformly polarized light. Thus, these optical elements together constitute a polarization conversion device. The relationship among these optical elements will be described in detail later.

The second lens array 6 and the superimposing lens 8 disposed immediately behind it allow the images formed on the individual lens cells of the first lens array 4 to be superimposed on one another on a display panel described later. Immediately behind the superimposing lens 8, an illumination optical system 13 is disposed that is built as a telecentric system that illuminates the display panel. The superimposing lens 8 maybe formed integrally with the second lens array 6. The optical elements described above, starting with the first lens array 4 and ending with the superimposing lens 8, together constitute an integrator optical system I having an optical axis La.

Behind the illumination optical system 13, a TIR prism 22 is disposed. The TIR prism 22 is composed of two, large and small, prisms 22b and 22a, each having the shape of a triangular prism and made of glass or the like, that are arranged so as to face each other at predetermined sides of their surfaces. The prism 22b has an entrance surface 22ba, a total-reflection surface 22bb serving also as an exit surface, and an entrance/exit surface 22bc; the prism 22a has an entrance surface 22aa and an exit surface 22ab. The total reflection surface 22bb and the entrance surface 22aa, at which the two prisms face each other, are arranged with a gap of several micrometers to several tens of micrometers secured between them.

The light 9 from the light source 1 and the reflector 2, having passed through the illumination optical system 13, is directed along the optical axis La to the prism 22b through a condenser lens 23 disposed immediately in front of it so that the light 9 enters the prism 22b through the entrance surface 22ba thereof. Then, most of the light 9, striking the total-reflection surface 22bb at angles of incidence greater than the critical angle, is reflected therefrom, exits from the prism 22b through the entrance/exit surface 22bc thereof, and travels toward the display panel 16. Immediately in front of the display panel 16 is disposed a birefringent microcylinderlens array 15a that exerts the effect of microlenses on light polarized in a predetermined manner. The arrangement described so far provides an example of an illumination optical apparatus.

The display panel 16 is a DMD that reflects pixel by pixel the light 9 shone thereon either with micromirrors in their "on" state or with micromirrors in their "off" state in accordance with the given display data. The "on" reflected light returns through the birefringent microcylinderlens array 15a to the prism 22b, entering it through the entrance/exit surface 22bc thereof.

This light then strikes the total-reflection surface 22bb at angles of incidence smaller than the critical angle so as to be transmitted therethrough, is then transmitted through the prism 22a, entering it through the entrance surface 22aa thereof and exiting therefrom through the exit surface 22ab thereof, and then reaches, as projection light 21, a projection optical system 24 along the optical axis Lb. Thus, through this projection optical system 24, the display data presented on the display panel 16 is projected on a screen (not shown). In the figure, the light 21 is omitted. On the other hand, the "off" reflected light, even though it is transmitted through the prisms 22b and 22a, is eventually directed in a direction that does not lead to the projection optical system 24. The arrangement of the projection optical system and the screen described above provides an example of a projection optical apparatus.

In this embodiment, the optical axis Lb of the light 21, i.e. the "on" reflected light, is not perpendicular to the display surface of the display panel 16 as will be described later. Accordingly, the projection optical system 24 needs to be a decentered projection optical system that is not a centered system. A practical example of such a decentered projection optical system is proposed, for example, in Japanese Patent Application Laid-Open H9-179064, as the fourth embodiment disclosed therein.

Figure 2B:
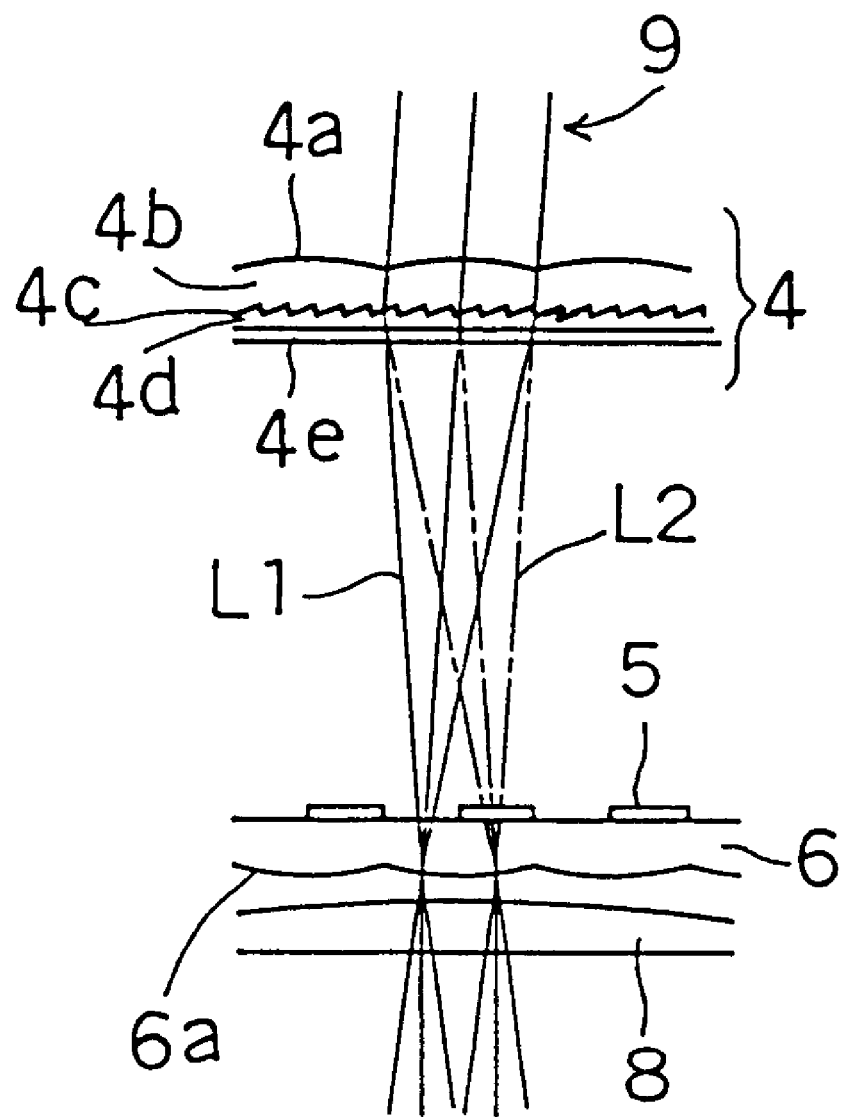

FIGS. 2A and 2B are enlarged views schematically showing a principal portion of the display optical apparatus of the first embodiment of the invention. Of these figures, FIG. 2A shows a general view of this portion, and FIG. 2B shows a side view of the portion corresponding to the integrator optical system mentioned above. As described already with reference to FIG. 1, the light 9 having traveled along the optical axis L is reflected from the dichroic mirrors $R_m$, $G_m$, and $B_m$ individually so as to reach the first lens array 4 disposed further behind (i.e., in the figure, below) by traveling along differently inclined optical axes $L_R$, $L_G$, and $L_B$, respectively. In FIG. 2A, the light 9 is omitted.

Behind the first lens array 4 are disposed, somewhat away therefrom, a second lens array 6, and then immediately behind it, a superimposing lens 8. The first lens array 4 has lens cells 4a arranged in a grid-like formation, and the second lens array 6 has lens cells 6a arranged in a grid-like formation that is different from that of the first lens array 4. The light 9, having reached the first lens array 4 by traveling along differently inclined optical axes for R, G, and B light, is focused, through the individual lens cells 4a of the first lens array 4, on the individual lens cells 6a of the second lens array 6 disposed behind it somewhat away therefrom. At this time, since R, G, and B light travels in different directions, light-source images are formed separately for R, G, and B light. Here, R, G, and B light is individually focused almost exactly in positions where it should be focused, but, to enhance color purity, RGB color filters are provided. These color filters cause almost no loss of light.

Moreover, as shown in FIG. 2B, the first lens array 4 has a birefringent diffraction grating, and performs polarization separation on the light 9 to separate it in the direction of the shorter sides of the individual lens cells of the second lens array 6. Thus, the light 9 is, while traveling through the first lens array 4 and the second lens array 6, subjected to polarization conversion and thereby formed into uniformly polarized light. Now, the principle of this polarization conversion will be described with reference to FIG. 2B. First, the light 9 is a beam of unpolarized light, and enters the integrator optical system I. The integrator optical system I includes, from the entrance side thereof, the first lens array 4, a half-wave plate 5, the second lens array 6, and the superimposing lens 8. The first lens array 4 has a birefringent diffraction grating 4c, having blaze-shaped grooves, formed on a base plate 4b made of glass or the like, and has its portion that makes contact with the blaze-shaped grooves filled with a birefringent optical material 4d that is sealed in by a glass plate 4e.

The birefringent optical material 4d exhibits different refractive indices for rays polarized in different polarization directions. In this example, the refractive index for rays L1 having a polarization plane parallel to the plane of the figure is different from the refractive index for rays L2 having a polarization plane perpendicular to the plane of the figure. Moreover, the birefringent diffraction grating 4c is so shaped as to deflect straight-traveling light. Here, if the refractive index for rays L1 having a polarization plane parallel to the plane of the figure is made equal to the refractive index of the material of the base plate, rays L1 having a polarization plane parallel to the plane of the figure, as indicated by solid lines, travel as if the birefringent diffraction grating 4c were absent; by contrast, rays L2 having a polarization plane perpendicular to the plane of the figure, as indicated by dash-and-dot lines, are affected by the birefringent diffraction grating 4c and thus deflected.

On the other hand, the first lens array 4 divides the light 9 incident thereon spatially and focuses it on the second lens array 6. Here, rays L1 having a polarization plane parallel to the plane of the figure travel straight and are then focused, whereas rays L2 having a polarization plane perpendicular to the plane of the figure are deflected and then focused. Accordingly, rays L1 having a polarization plane parallel to the plane of the figure and rays L2 having a polarization plane perpendicular to the plane of the figure are focused in spatially separate positions. Thus, by disposing the half-wave plate 5 near the second lens array 6, on the light-source side thereof, where rays having one of the two polarization planes mentioned above are focused, it is possible to make the polarization plane of those rays identical with that of rays having the other polarization plane.

Here, the half-wave plate 5 is used for rays L2. Thus, as illumination light, uniformly polarized light having a polarization plane parallel to the plane of the figure exits from the integrator optical system I. The birefringent optical material is obtained, for example, by orienting a liquid crystal material in a predetermined direction. Alternatively, a liquid-crystal material is known that is hardened by being irradiated with ultraviolet light or the like, and therefore such a liquid-crystal material may be used, after first being oriented as described above and then being irradiated with ultraviolet light or the like.

Back in FIG. 2, the second lens array 6 and the superimposing lens 8 disposed immediately behind it allow the images formed on the individual lens cells of the first lens array 4 to be superimposed on one another on the display panel 16. The illumination optical system 13 disposed immediately behind the superimposing lens 8 achieves telecentric illumination of the display panel 16. As shown also in FIG. 1, immediately in front of the display panel 16, the birefringent microcylinderlens array 15a made of a birefringent material is disposed.

The light 9, after being separated into R, G, and B light by the dichroic mirrors and the first and second lens arrays, passes through the illumination optical system 13 and the TIR prism 22, and then, through the individual microcylinderlenses 15aa of the birefringent microcylinderlens array 15a, illuminates the pixels 16b of the display panel 16 in such a way that light of each color illuminates several of the pixels 16b. Instead of the microcylinderlenses 15aa, it is possible to use a diffraction lens. It is to be noted that FIG. 2 shows only parts of the microcylinderlens array 15a and the display panel 16, i.e. the remaining parts thereof extending further rightward and leftward are omitted. Between the microcylinderlens array 15a and the display panel 16 is disposed a quarter-wave plate 10, which will be described later.

In this embodiment, a gap of 2 to 3 mm is secured between the birefringent microcylinderlens array 15a and the display panel 16, and therefore there is sufficient space to dispose the birefringent microcylinderlens array 15a outside the protective glass 16a protecting the pixels 16b of the DMD of the display panel 16. Moreover, although light of each color is shown to illuminate four pixels FIG. 2A, in reality, if the protective glass 16a is assumed to be about 2 mm thick, the space to dispose the birefringent microcylinderlens array 15a needs to be secured in such a way that light of each color illuminates six to ten pixels.

In this way, with the microcylinderlens array placed 2 to 3 mm away from the surface of the DMD, illumination is achieved in such a way that R, G, and B light each illuminates several contiguous pixels as one illuminated region. In addition, in this embodiment, the birefringent microcylinderlens array 15a is driven along its surface with a fine pitch at a time or continuously within each frame as indicated by an arrow Aw FIG. 2A or in FIG. 1 in order to shift the illumination light on the pixels. By feeding display data to the pixels in synchronism with this shifting of the illumination light, it is possible to achieve satisfactory color display over the whole screen. A detailed description will be given later. In this case, as shown in FIG. 1, instead of driving the birefringent microcylinderlens array 15a, it is also possible, for example, to drive part of the lenses of the illumination optical system 13 vertically to the optical axis La as indicated by an arrow Bw, or provide a mirror in the illumination optical system 13 and drive it to rotate.

Figure 3:
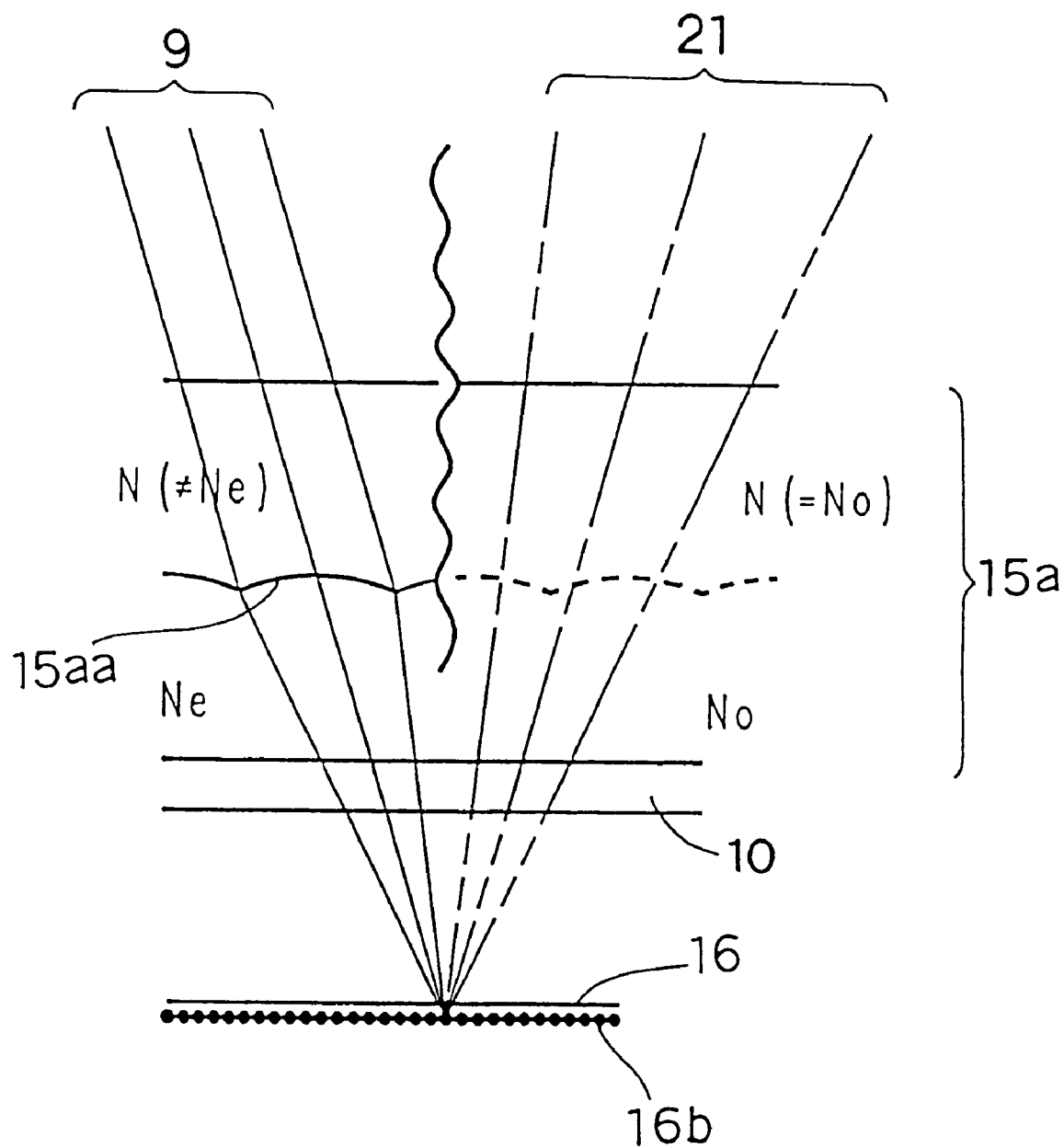
FIG. 3 is a diagram schematically showing the material structure of the microcylinderlens array used in the display optical apparatus of the first embodiment.

FIG. 3 is a diagram schematically showing the material structure of the birefringent microcylinderlens array. In this embodiment, a DMD, which is a reflection-type display panel, is used as the display panel 16, and therefore both the light 9 (illumination light, indicated by solid lines) traveling toward the display panel 16 and the light 21 (projection light, indicated by dash-dot-dot lines) reflected from the display panel 16 pass through the birefringent microcylinderlens array 15a (of a lenticular type having a lens-shaped section) disposed immediately in front of the display panel 16. Whereas the light 9 traveling toward the display panel 16 behaves as described above, the light 21 reflected therefrom, if left as it is, is disturbed by the birefringent microcylinderlens array 15a, and this degrades image quality.

To cope with this, in this embodiment, the birefringent microcylinderlens array 15a is made of an isotropic optical material and a birefringent optical material, and in addition a quarter-wave plate 10 is disposed between the birefringent microcylinderlens array 15a and the display panel, 16. In the figure, whereas the light 9 traveling toward the display panel 16 has a particular polarization plane, for example a polarization plane parallel to the plane of the figure, the light 21, i.e. the portion of the light reflected from the display panel 16 that is used to display an image, has a polarization plane rotated relative thereto, for example a polarization plane perpendicular to the plane of the figure. This is because the quarter-wave plate 10 eventually acts as a half-wave plate on the light that passes therethrough, twice in total.

Here, suppose that, of the materials of which the birefringent microcylinderlens array 15a is made, the isotropic optical material, which is used above the microcylinderlenses 15aa, has a refractive index N, and the birefringent optical material, which is used below the microcylinderlenses 15aa, exhibits a refractive index Ne for the polarization plane of the light 9 and a refractive index No for the polarization plane of the light 21. Then, if N=No, the birefringent microcylinderlens array 15a acts as a microcylinderlens array toward the light 9 and acts as a simple transparent flat plate toward the light 21. In this way, despite the use of a reflection-type display panel, it is possible to prevent degradation of image quality in the light 21.

Here, instead of disposing such a birefringent microcylinderlens array between the TIR prism 22 and the display panel 16, it is also possible to dispose a microcylinderlens array between the condenser lens 23 shown in FIG. 1 and the TIR prism 22. In this arrangement, a sufficient distance to the display panel 16 can be secured, and only the illumination light passes through the microcylinderlens array. This eliminates the risk of disturbance of the projection light as described with reference to FIG. 3. As a result, it is no longer necessary to perform polarization conversion through the integrator optical system I, and thus no birefringent effect is required in the microcylinderlens array. In this case, the microcylinderlens array is placed far away from the DMD panel, so that light of each color illuminates several tens of contiguous pixels.

Figure 4:
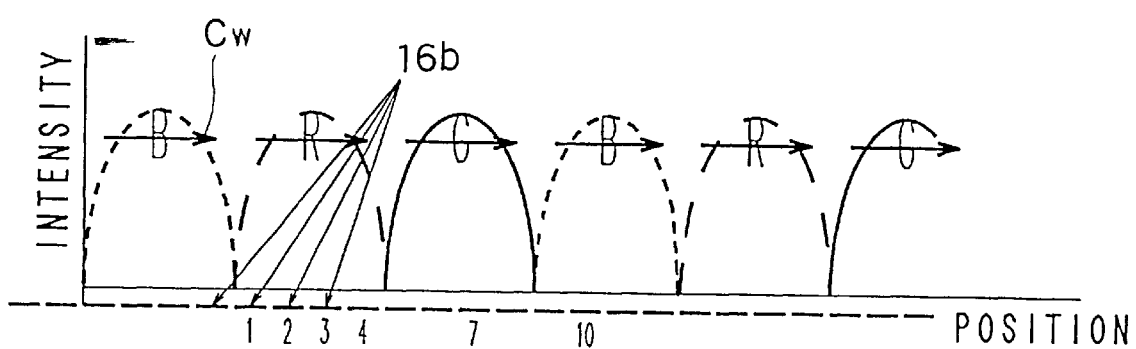
FIG. 4 is a diagram illustrating the principle of achieving color display by shifting the illumination light shone on the pixels (structure)
Figure 5:
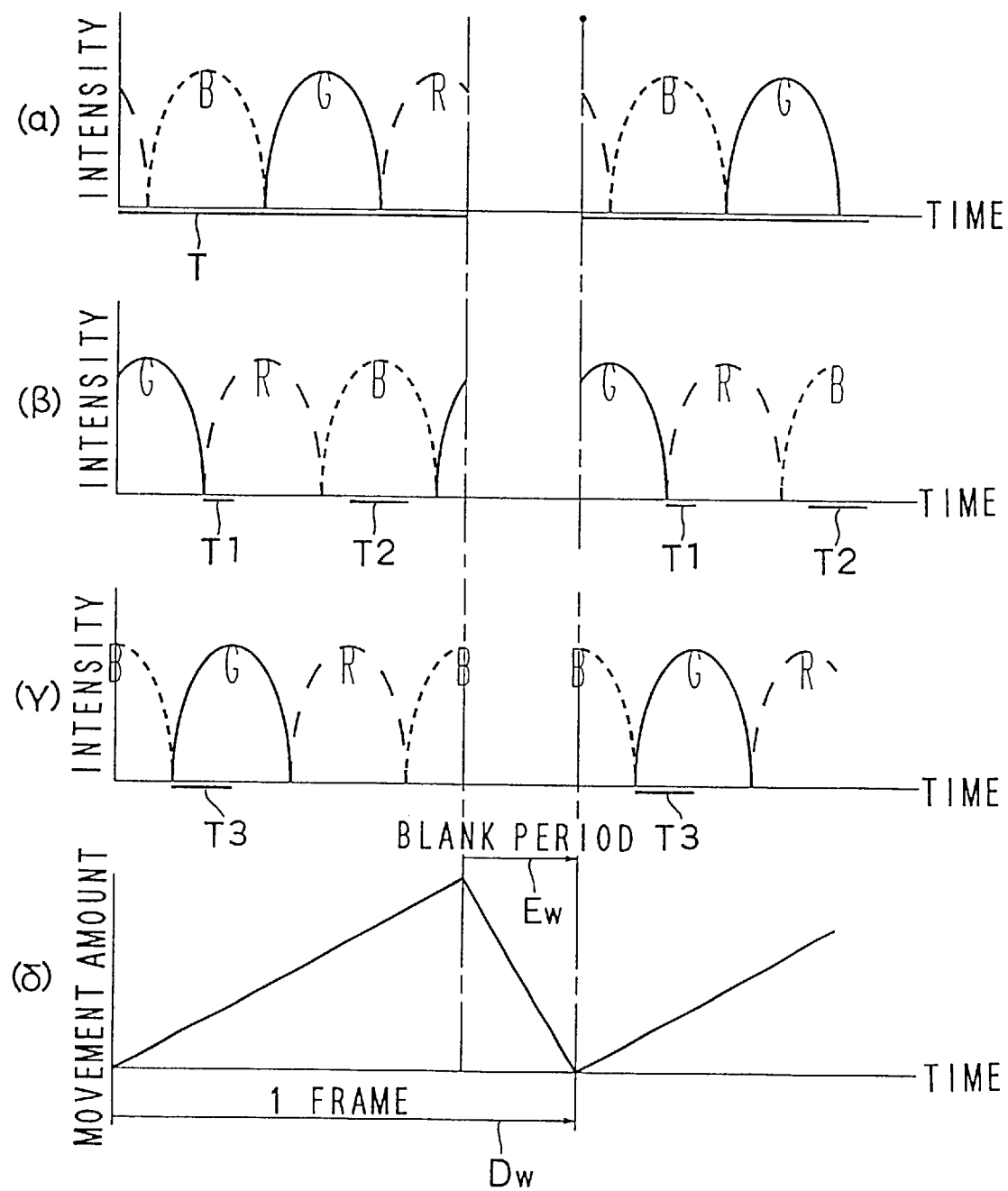
FIG. 5 is a diagram illustrating the principle of achieving color display by shifting the illumination light shone on the pixels (operation)

FIGS. 4 and 5 are diagrams illustrating the principle of achieving color display by shifting the illumination light on the pixels as described above. FIG. 4 shows the relationship between the position on the display panel and the illumination light, with the position taken along the horizontal axis and the intensity of the illumination light taken along the vertical axis. In FIG. 5, at (α) to (γ) is shown the relationship between the lapse of time and the illumination light at different pixels, with the lapse of time taken along the horizontal axis and the intensity of the illumination light taken along the vertical axis; at (δ) is shown the movement of the microcylinderlens array, with the lapse of time taken along the horizontal axis and the movement amount of the microcylinderlens array taken along the vertical axis. This movement may be achieved as the movement of the illumination optical system.

First, in FIG. 4, select one of the pixels 16b of the display panel 16 and assign it number 1. Then, starting with this pixel rightward, assign one pixel after another an integer number in ascending order. When the birefringent microcylinderlens array 15a (or the illumination optical system 13) is driven, the illumination regions of R, G, and B light all move rightward together as indicated by an arrow Cw. Here, it is assumed that the illuminated regions of R, G, and B light each exhibit an intensity distribution shaped like, for example, the upper half of an oval as indicated by broken, solid, and dotted lines respectively. It is to be noted that light of each color may illuminate any number of pixels as one illuminated region other than four as shown in this figure.

Now, focus attention on pixel number 1. As shown at (α) in FIG. 5, to turn this pixel white, the pixel is kept on continuously as indicated by a solid line T so that all of R, G, and B colors are displayed fully. Next, focus attention on pixel number 7. As shown at (β) in FIG. 5, to turn this pixel bluish purple with medium brightness, the pixel is kept on only for a short period in a peripheral portion (with low intensity) of the illumination region of R light and then for a longer period in a central portion (with high intensity) of the illumination region of B light as indicated by solid lines T1 and T2 respectively.

Next, focus attention on pixel number 10. As shown at (γ) in FIG. 5, to turn this pixel green with medium brightness, the pixel is kept on only for a period corresponding to the portion between the start point and the center of the illuminated region of G light as indicated by a solid line T3. In this way, the period for which a pixel lies within the illumination region of light of each color is divided, and the hue and shades at that pixel are controlled by keeping the pixel on only for appropriately selected portions of the so divided periods for individual colors. It is to be noted that the period for which a pixel is illuminated with each color may be divided into any number of portions other than four as in the example described above; finer division of this period makes subtler rendering of hue and shades possible.

To achieve so-called full-color display, it is necessary to produce 255 shades of each color. Conventionally, shades of a color are produced by digitally controlling the period for which a pixel is kept on under uniform illumination in 255 levels. However, where, as in this embodiment, the intensity of the illumination light varies within each illuminated region, it is not necessary to divide the period for which a pixel lies within the illuminated region of each color as finely as into 255 portions; the same level of full-color display as achieved conventionally can be achieved by combining portions of relatively roughly divided periods for individual colors.

In this embodiment, as shown at (δ) in FIG. 5, the birefringent microcylinderlens array 15a is driven with a fine pitch at a time or continuously, with a cycle equal to the period of one frame, indicated by an arrow Dw. This cycle needs to include a blank period, indicated by an arrow Ew, to permit the birefringent microcylinderlens array 15a to be brought back to its original position, and no display is made during this blank period. It is to be noted that the arrangement described so far that achieves color display by shifting the illumination light on the pixels does not necessarily employ a DMD as the display panel, but may employ a devide that offers quicker on/off response such as a ferroelectric liquid crystal display panel.

Figure 6:
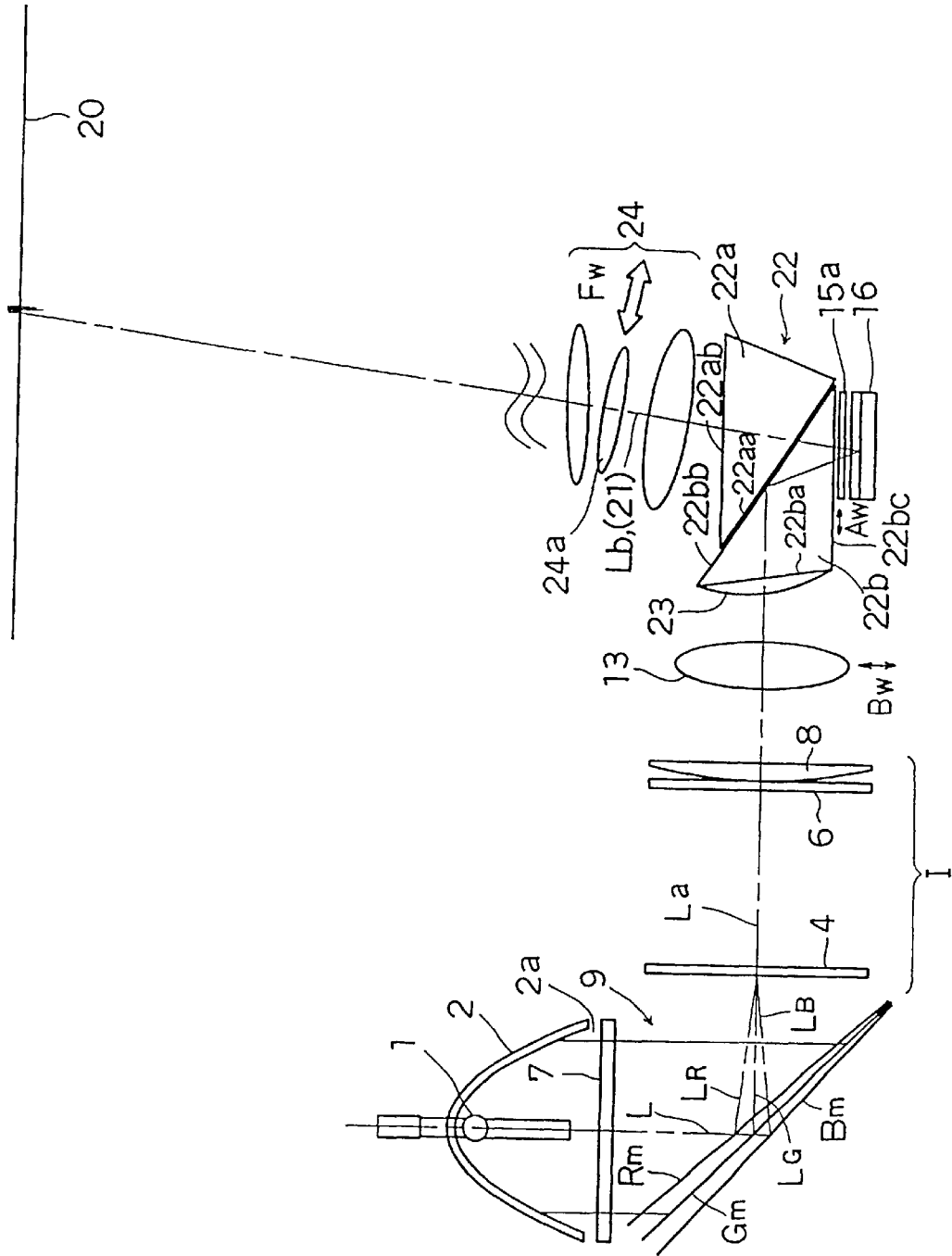
FIG. 6 is a diagram schematically showing the construction of a display optical apparatus of a second embodiment of the invention.

FIG. 6 is a diagram schematically showing the construction of the display optical apparatus of a second embodiment of the invention. It is to be noted that, in reality, the individual optical elements constituting it are arranged three-dimensionally but, in this figure, they are illustrated two-dimensionally for easier understanding. The construction of this embodiment is almost the same as that of the first embodiment shown FIG. 1, but differs therefrom in that, instead of driving the birefringent microcylinderlens array, the projection lens 24a constituting the projection optical system 24 is driven perpendicularly to the optical axis Lb with a pitch corresponding to one pixel at a time (or continuously) within each frame as indicated by an arrow Fw so that the projection light on the screen 20 is shifted one pixel at a time. By feeding display data to the pixels in synchronism with this shifting of the projection light, it is possible to achieve satisfactory color display on the whole screen.

Figure 7:
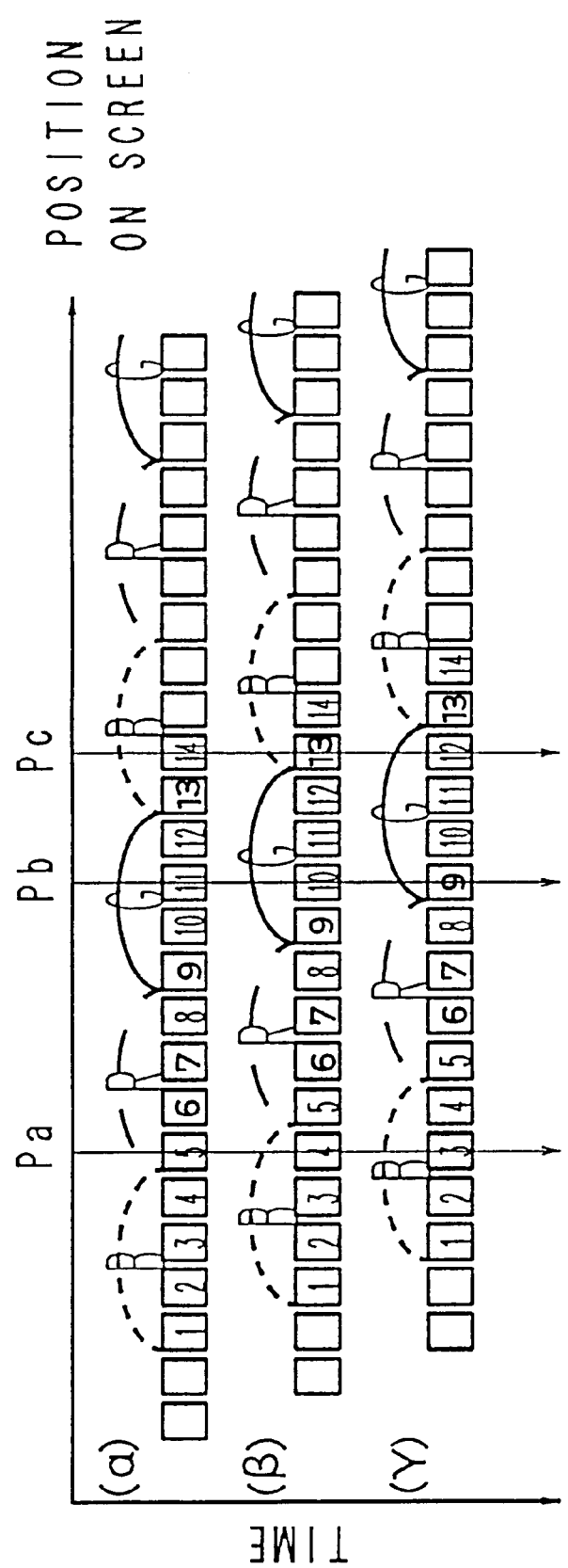
FIG. 7 is a diagram illustrating the principle of achieving color display by shifting the projection light projected on the screen (structure)
Figure 8:
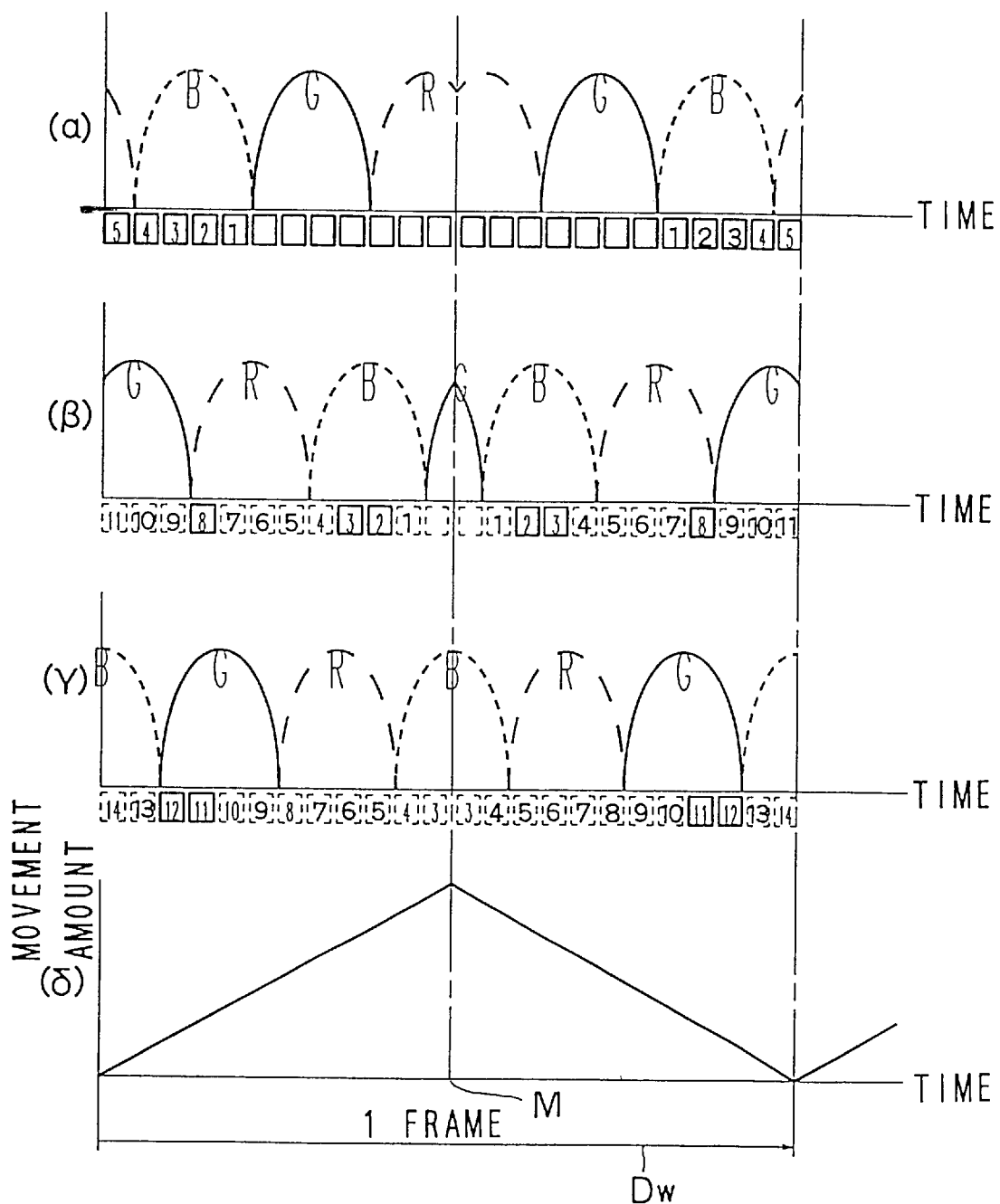
FIG. 8 is a diagram illustrating the principle of achieving color display by shifting the projection light projected on the screen (operation)

FIGS. 7 and 8 are diagrams illustrating the principle of achieving color display by shifting the projection light on the screen as described above. FIG. 7 shows the relationship between the position on the screen and the projection light as observed at different time points, with the position taken along the horizontal axis and the lapse of time taken along the vertical axis. In FIG. 8, at ($\alpha$) to ($\gamma$) is shown the relationship between the lapse of time and the projection light in different positions on the screen corresponding to different pixels, with the lapse of time taken along the horizontal axis and the intensity of the projection light taken along the vertical axis; at ($\delta$) is shown the movement of the projection lens, with the lapse of time taken along the horizontal axis and the movement amount of the projection lens taken along the vertical axis.

First, in FIG. 7, select one of the pixels projected on the screen 20 that correspond to the individual pixels of the display panel 16 and assign it number 1. Then, starting with this pixel rightward, assign one pixel after another an integer number in ascending order. Here, for simplicity's sake, only numbers 1 to 14 are assigned. Moreover, here, it is assumed that the illuminated regions of R, G, and B light are arranged in the order B, R, and G, and they each correspond to four pixels. Of course, each of these illuminated regions may correspond to any number of pixels other than four as in this example. When the projection lens 24a is driven, the illumination regions of R, G, and B light and the pixels corresponding thereto move rightward one pixel at a time as shown at ($\alpha$) to ($\gamma$) in FIG. 7. In reality, this shifting continues further.

In FIG. 8, it is assumed that the illuminated regions of R, G, and B light each exhibit an intensity distribution shaped like, for example, the upper half of an oval as indicated by dotted, broken, and solid lines respectively. Now, focus attention on position "Pa" on the screen shown in FIG. 7. As shown at ($\alpha$) in FIG. 8, to turn this position white, all the pixels passing it are turned on, as indicated by surrounding all the pixels with solid lines ,so that all of B, R, and G colors are displayed.

Next, focus attention on position "Pb" on the screen shown in FIG. 7. As shown at ($\beta$) in FIG. 8, to turn this position bluish purple with medium brightness, only a pixel in a peripheral portion (with low intensity) of the illuminated region of R light, for example pixel number 8, and pixels in a central portion (with high intensity) of the illuminated region of B light, for example pixels numbers 2 and 3, are turned on, as indicated by surrounding only the relevant pixels with solid lines. All the other pixels are kept off, as indicated by surrounding them with broken lines.

Next, focus attention on position "Pc" on the screen shown in FIG. 7. As shown at ($\gamma$) in FIG. 8, to turn this position green with medium brightness, only pixels lying in the portion between the start point to the center of the illuminated region of G light, for example pixels numbers 11 and 12, are turned on, as indicated by surrounding only the relevant pixels with solid lines. All the other pixels are kept off, as indicated by surrounding them with broken lines. In this way, the hue and shades in particular positions on the screen are controlled by turning on only appropriately selected ones of the pixels within the illuminated regions of individual colors. Here, how the period for which a particular position on the screen is illuminated with each color is divided depends on the size of the pixels. By dividing this period more finely, it is possible to achieve subtler rendering of hue and shades; in this case, shades of a color are produced in as many levels as the number of divisions of this period multiplied by the number of pixels included in each illuminated region.

In this embodiment, as shown at ($\delta$) in FIG. 8, the projection lens 24a is driven with a pitch corresponding to one pixel at a time (or continuously), with a cycle equal to the period of one frame, indicated by an arrow Dw. Here, when the center of a frame is reached, the projection lens 24 is driven in the reverse direction so that it is brought back to its original position at the end of the frame, and this eliminates the need for a blank period. However, here, the projection lens 24 does not necessarily have to be driven in this manner, but may be driven in the manner shown at ($\delta$) in FIG. 5 described previously; conversely, it is also possible to use the driving method shown at ($\delta$) in FIG. 8 in the construction of the first embodiment where the illumination light is shifted. It is to be noted that the arrangement described so far that achieves color display by shifting the projection light on the screen does not necessarily employ a DMD as the display panel, but may employ a device that offers quicker on/off response such as a ferroelectric liquid crystal display panel.

Figure 9:
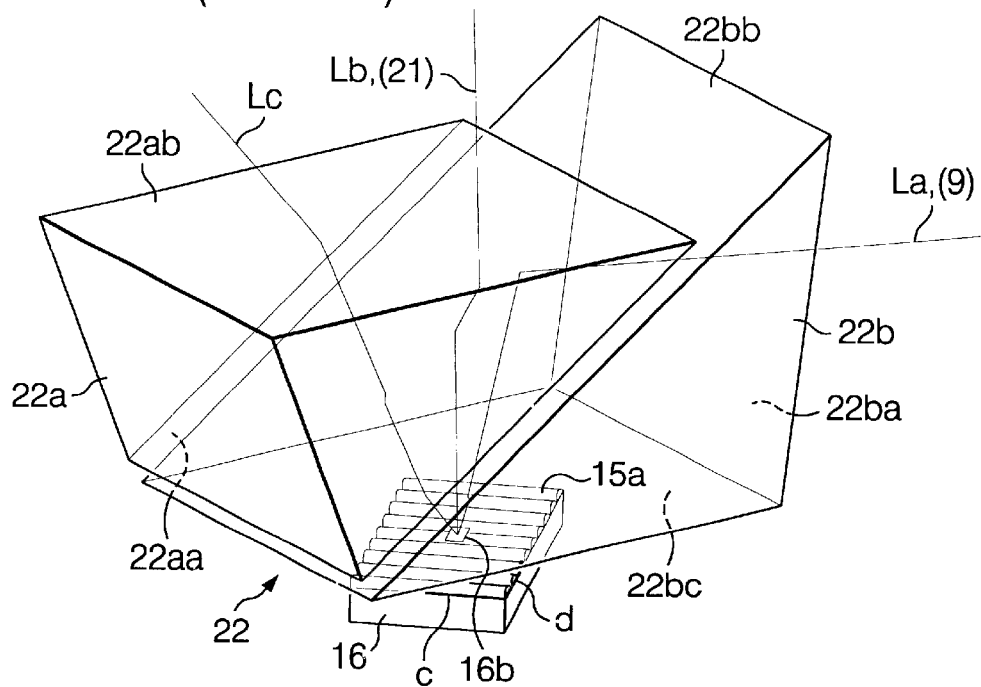
FIG. 9 is a perspective view schematically showing the arrangement around the TIR prism (in a conventional example)
Figure 10:
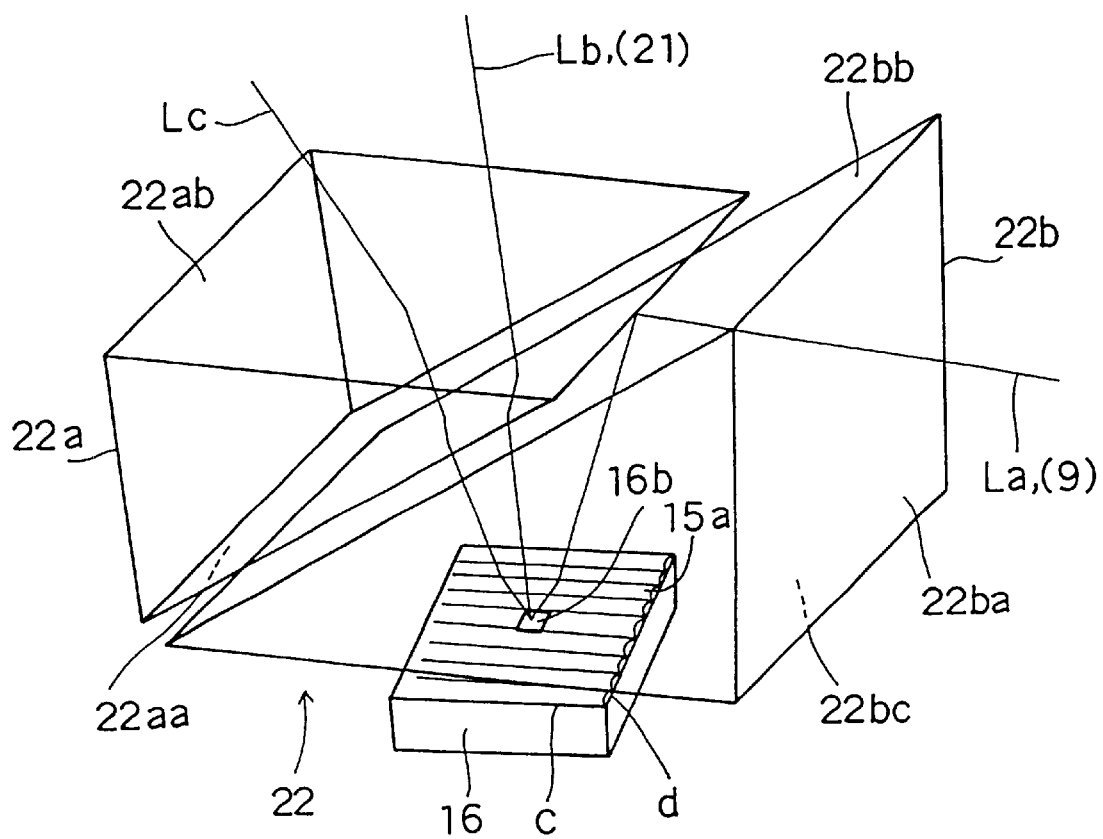
FIG. 10 is a perspective view schematically showing the arrangement around the TIR prism (in the first embodiment)
Figure 11:
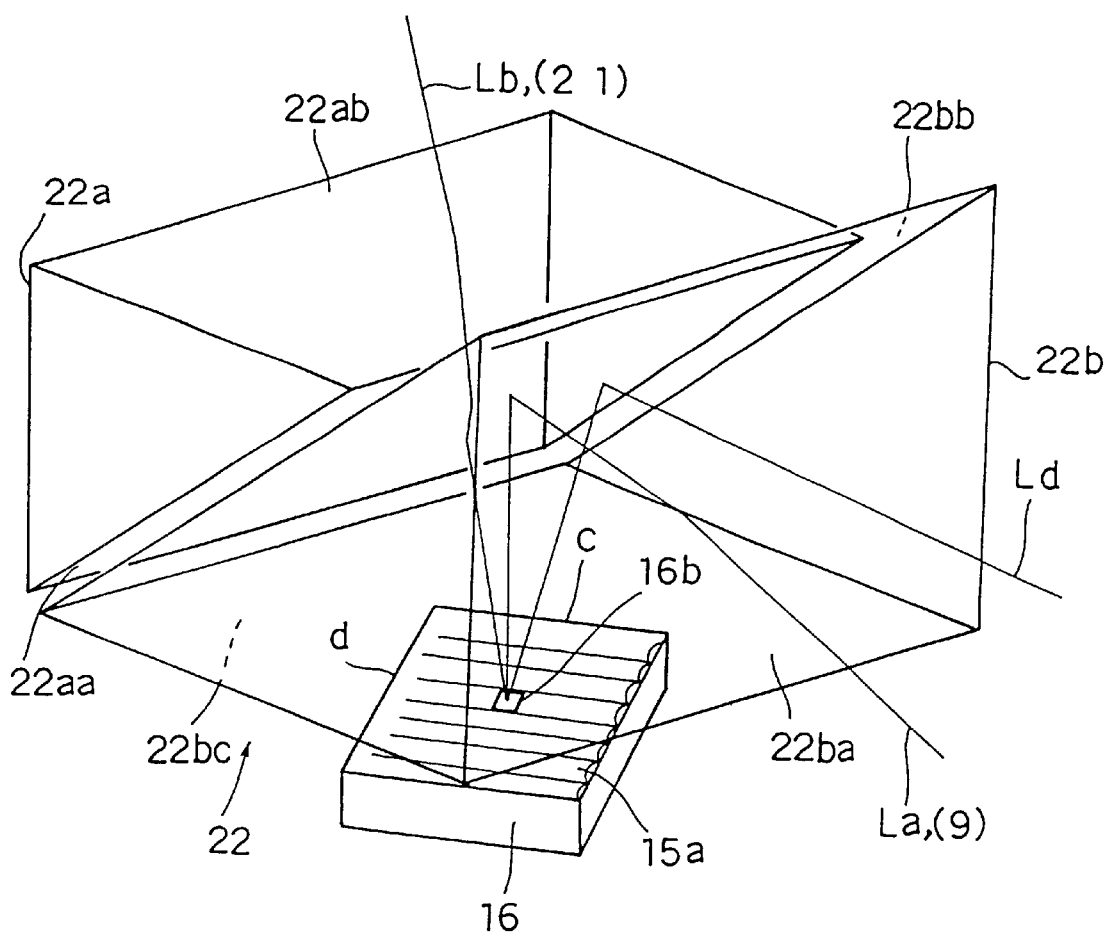
FIG. 11 is a perspective view schematically showing the arrangement around the TIR prism (in the second embodiment)

FIGS. 9 to 11 are perspective views schematically showing the arrangement around the TIR prism. Here, one of the shorter sides of the display panel 16 is referred to as the shorter side "c", and one of the longer sides thereof is referred to as the longer side "d". FIG. 9 shows a conventional arrangement. As shown in this figure, the light 9, which comes as illumination light from the integrator I (not shown here), reaches, along the optical axis La, the TIR prism 22 at an azimuth angle of 45° relative to the shorter side "c" of the display panel 16, and then enters the prism 22b through the entrance surface 22bathereof. This light is then reflected from the total-reflection surface 22bb, then exits from the prism 22b through the entrance/exit surface 22bc thereof, and then travels toward the display panel 16. Immediately in front of the display panel 16, the birefringent microcylinderlens array 15a is disposed. The azimuth angle may be measured relative to the longer side "d".

The light reflected from the "on" pixels 16b of the display panel 16 (i.e. "on" reflected light) passes through the birefringent microcylinderlens array 15*a*, then enters the prism 22*b* through the entrance/exit surface 22*bc* thereof, and is transmitted through the total-reflection surface 22*bb*. This light then passes through the prism 22*a*, entering it through the entrance surface 22*aa* thereof and exiting from it through the exit surface 22*ab* thereof, and then travels, as projection light (the light 21), along the optical axis Lb so as to reach the projection optical system (not shown). On the other hand, the light reflected from the "off" pixels 16 of the display panel 16 (i.e. "off" reflected light) takes the same path as the "on" reflected light, but eventually travels along the optical axis Lc and thus outside the projection optical system.

FIG. 10 shows the arrangement in the first embodiment. As shown in this figure, the light 9, which comes as illumination light from the integrator I (not shown here), reaches, along the optical axis La, the TIR prism 22 at an azimuth angle of approximately 0° relative to the shorter side "c" of the display panel 16, and then enters the prism 22*b* through the entrance surface 22*ba* thereof. This light is then reflected from the total-reflection surface 22*bb*, then exits from the prism 22*b* through the entrance/exit surface 22*bc* thereof, and then travels toward the display panel 16. Thereafter, the light travels as described with reference to FIG. 9.

FIG. 11 shows the arrangement in the second embodiment. As shown in this figure, the light 9, which comes as illumination light from the integrator I (not shown here), reaches, along the optical axis La, the TIR prism 22 at an azimuth angle of about 148° relative to the shorter side "c" of the display panel 16, and then enters the prism 22*b* through the entrance surface 22*ba* thereof. This light is then reflected from the total-reflection surface 22*bb*, then exits from the prism 22*b* through the entrance/exit surface 22*bc* thereof, and then travels toward the display panel 16. Immediately in front of the display panel 16, the birefringent microcylinderlens array 15*a* is disposed.

The light reflected from the "on" pixels 16*b* of the display panel 16 (i.e. "on" reflected light) passes through the birefringent microcylinderlens array 15*a*, then enters the prism 22*b* through the entrance/exit surface 22*bc* thereof, and is transmitted through the total-reflection surface 22*bb*. This light then passes through the prism 22*a*, entering it through the entrance surface 22*aa* thereof and exiting from it through the exit surface 22*ab* thereof, and then travels, as the light 21, i.e. projection light, along the optical axis Lb so as to reach the projection optical system (not shown). On the other hand, the light reflected from the "off" pixels 16 of the display panel 16 (i.e. "off" reflected light) returns to the prism 22*b* in the same manner as the "on" reflected light, but is reflected from the total-reflection surface 22*bb* and is thus eventually directed back toward the illumination side along the optical axis Ld.

The reason to adopt these arrangements is as follows. In the DMD, its micromirrors in their off state reflect the illumination light in a direction that does not lead to the projection optical system. However, this "off" reflected light also passes through the TIR prism, and therefore part of this light reaches the projection optical system and appears as flare on the screen.

Figure 12:
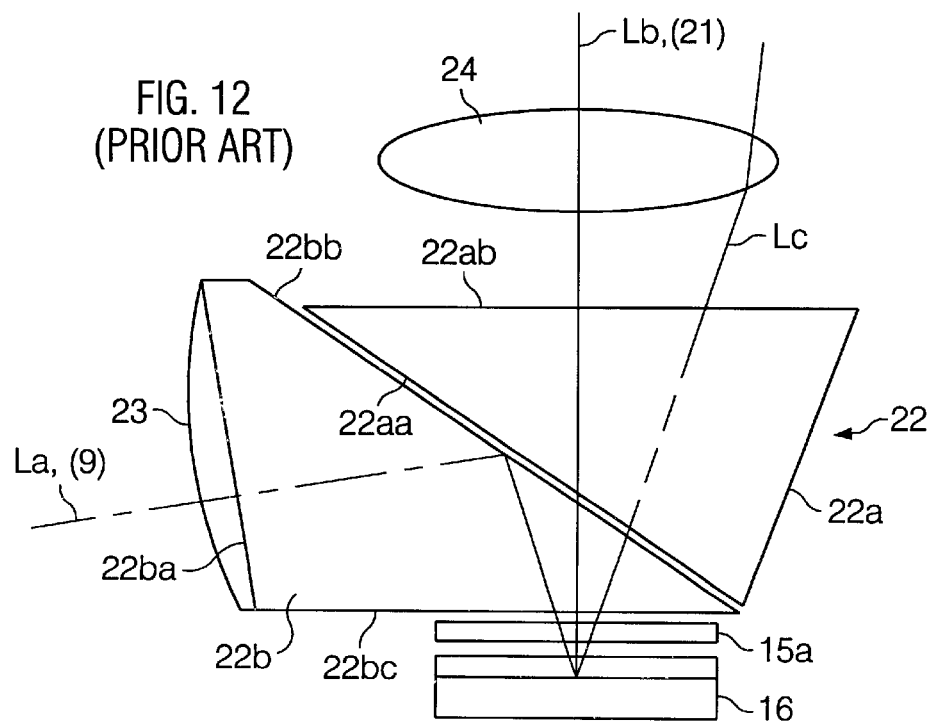
FIG. 12 is a perspective view schematically showing the arrangement around the TIR prism in a conventional example.

More specifically, as shown in FIG. 12, which schematically shows the arrangement around the TIR prism in the same manner as FIG. 1 does, the light 9, i.e. illumination light, is directed along the optical axis La to the prism 22*b* through the condenser lens 23 disposed immediately in front of it so that the light 9 enters the prism 22*b* through the entrance surface 22*ba* thereof. Then, most of the light 9, striking the total-reflection surface 22*bb* at angles of incidence greater than the critical angle, is reflected therefrom, exits from the prism 22*b* through the entrance/exit surface 22*bc* thereof, and travels toward the display panel 16. Immediately in front of the display panel 16 is disposed the birefringent microcylinderlens array 15*a* that exerts the effect of microlenses on light polarized in a predetermined manner.

The display panel 16 is a DMD that reflects pixel by pixel the light 9 shone thereon either with micromirrors in their "on" state or with micromirrors in their "off" state in accordance with the given display data. The "on" reflected light returns through the birefringent microcylinderlens array 15*a* to the prism 22*b*, entering it through the entrance/exit surface 22*bc* thereof. This light then strikes the total-reflection surface 22*bb* at angles of incidence smaller than the critical angle so as to be transmitted therethrough, is then transmitted through the prism 22*a*, entering it through the entrance surface 22*aa* thereof and exiting therefrom through the exit surface 22*ab* thereof, and then reaches, as the light 21, i.e. projection light, the projection optical system 24 along the optical axis Lb. Through this projection optical system 24, the display data displayed on the display panel 16 is projected on the screen (not shown).

On the other hand, the "off" reflected light, even though it is transmitted through the prisms 22*b* and 22*a*, is eventually directed, along the optical axis Lc, in a direction that does not lead to the projection optical system 24. However, part of this light reaches the projection optical system 24, in particular the peripheral portion thereof, and appears as flare on the screen. To prevent this, the arrangement shown in FIG. 11 is so built as to completely intercept the "off" reflected light.

Figure 14:
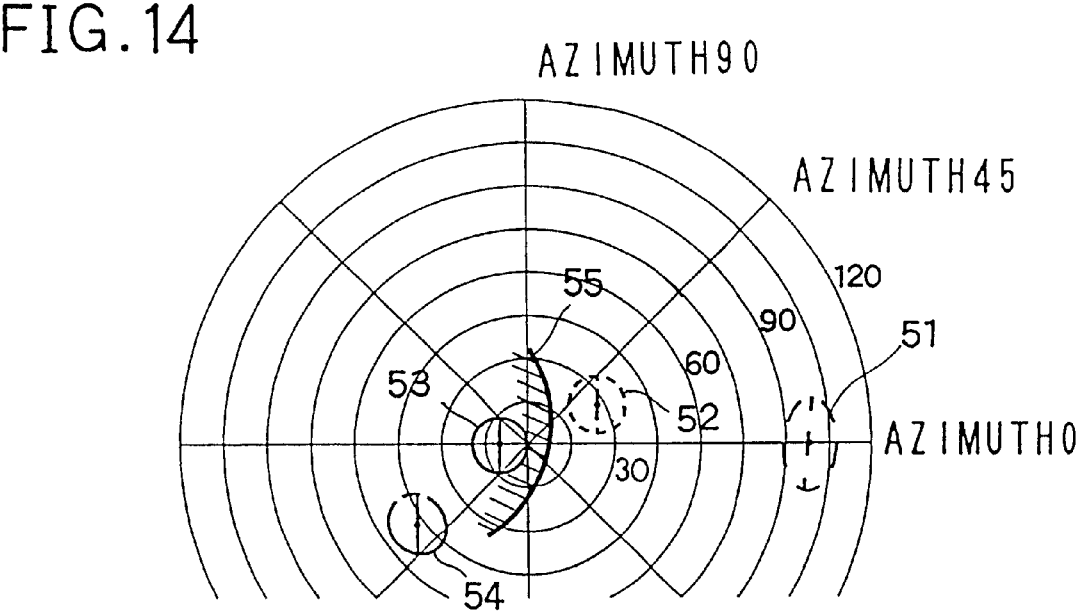
FIG. 14 is a diagram showing the ranges of angles of the illumination and projection light in the construction of the first embodiment.
Figure 15:
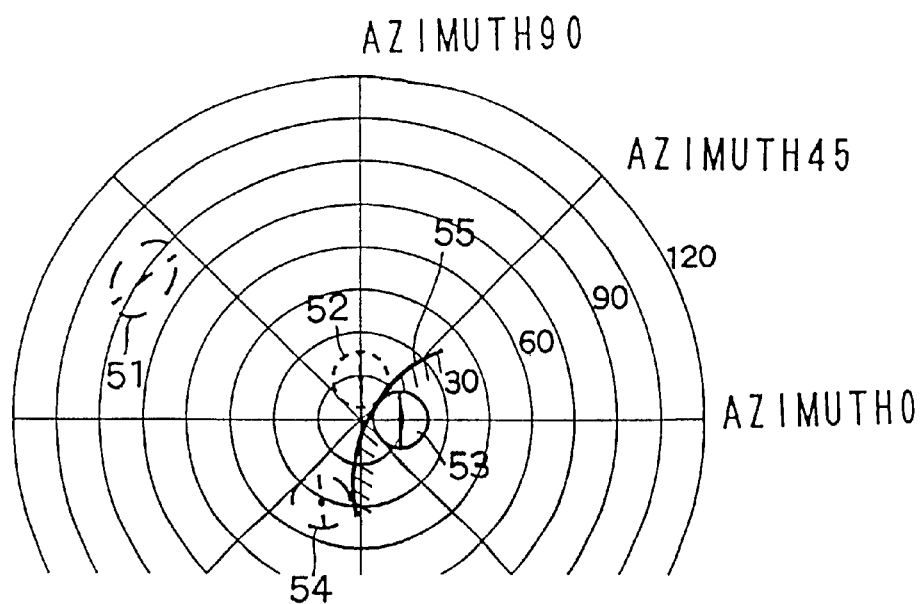
FIG. 15 is a diagram showing the ranges of angles of the illumination and projection light in the construction of the second embodiment.

FIGS. 13 to 15 are diagrams showing the angular relationship between the illumination light and the projection light, and correspond to the arrangements shown in FIGS. 9 to 11, respectively. In each of FIGS. 13 to 15, the angle of incidence of the illumination light and the angle of reflection of the projection light with respect to the display panel 16 are plotted on concentric circles whose radii are proportional to the angles' they represent. Moreover, the direction of the shorter side "c" of the display panel 16 is represented by a horizontal axis that passes through the center O of the concentric circles, with the rightward direction along it representing an azimuth angle of 0°, and the direction of the longer side "d" of the display panel 16 is represented by a vertical axis that passes through the center O of the concentric circles, with the upward direction along it representing an azimuth angle of 90°.

Moreover, in these figures, a broken-line circle 51 indicates the range of angles of the beam of the illumination light entering the TIR prism 22, and a dotted-line circle 52 indicates the range of angles of the beam of the illumination light striking the display panel 16. Moreover, a solid-line circle 53 indicates the range of angles of the beam of the "on" reflected light (the projection light) exiting from the display panel 16, and a dash-and-dot-line circle 54 indicates the range of angles of the beam of the "off" reflected light exiting from the display panel 16. Each of these circles indicates the range of angles of the corresponding light beam in which the f/number is f/3. Furthermore, a solid-line arc 55 represents the boundary between the ranges of angles of light reflected from and transmitted through the total-reflection surface of the TIR prism, with the region for transmitted light indicated by hatching.

FIG. 13 shows the ranges of angles of the illumination and projection light in the conventional arrangement described above. In this figure, as indicated by the circle 51, the azimuth angle of the illumination light entering the TIR prism 22 is 45°, and the angle of incidence of the same light with respect to the display panel 16 is 105°. As indicated by the circle 52, the azimuth angle of the illumination light striking the display panel 16 is 45°, and the angle of incidence of the same light is 20°. As indicated by the circle 53, the angle of reflection of the "on" reflected light (projection light) exiting from the display panel 16 is 0°. As indicated by the circle 54, the azimuth angle of the "off" reflected light exiting from the display panel 16 is 225°, and the angle of reflection of the same light is 40°.

As indicated by the arc 55, the azimuth angle of the TIR prism 22 is 45°, and the inclination of the total-reflection surface with respect to the display panel 16 is 30.50°. As shown in the figure, in the conventional arrangement, the beam of the illumination light striking the display panel 16, indicated by the circle 52, and the beam of the "on" reflected light (projection light) exiting from the display panel 16, indicated by the circle 53, are located close to each other, and they are barely separated by the TIR prism 22 indicated by the arc 55. Thus, here, it is not possible to use a bright lens having a small f/number.

FIG. 14 shows the ranges of angles of the illumination and projection light in the arrangement of the first embodiment described above. In this figure, as indicated by the circle 51, the azimuth angle of the illumination light entering the TIR prism 22 is 0°, and the angle of incidence of the same light with respect to the display panel 16 is somewhat less than 100°. As indicated by the circle 52, the azimuth angle of the illumination light striking the display panel 16 is about 30°, and the angle of incidence of the same light is somewhat less than 30°. As indicated by the circle 53, the azimuth angle of the "on" reflected light (projection light) exiting from the display panel 16 is 180°, and the angle of reflection of the same light is about 10°. As indicated by the circle 54, the azimuth angle of the "off" reflected light exiting from the display panel 16 is somewhat more than 210°, and the angle of reflection of the same light is somewhat more than 45°.

As indicated by the arc 55, the azimuth angle of the TIR prism 22 is −12°, and the inclination of the total-reflection surface with respect to the display panel 16 is 34°. As shown in the figure, in the arrangement of the first embodiment, the beam of the illumination light striking the display panel 16, indicated by the circle 52, and the beam of the "on" reflected light (projection light) exiting from the display panel 16, indicated by the circle 53, leave sufficient margins outside their f/3 regions. Thus, here, it is possible to use a brighter lens having a small f/number. Moreover, the illumination light entering the TIR prism 22 is directed thereto from a direction along the shorter side "c" of the display panel 16. This makes it possible to make the TIR prism 22 slimmer and the back-focal length of the projection optical system 24 shorter.

In this way, by inclining the projection light from the direction perpendicular to the display panel to a direction somewhat inclined in the direction of the shorter sides of the display panel and by using a decentered projection optical system, it is possible to achieve a brighter f/number. Moreover, by designing the TIR prism in such a way that the illumination light is directed thereto from a direction that almost coincides with the direction of the shorter sides of the display panel, it is possible to make the TIR prism smaller and the construction of the projection optical system simpler.

In general, in an arrangement where the azimuth angle and the inclination of the micromirrors of a DMD consti- tuting the individual pixels of a display panel are 45° and 10° respectively (with respect to the shorter sides of the display panel), as long as the azimuth angle and the angle of incidence of the illumination light striking the display panel are within the range from 15° to 40° and within the range from 17° to 45° respectively, even if the illumination light entering the TIR prism is directed thereto from a direction along the direction of the shorter sides of the display panel (i.e. at an azimuth angle of 0°), it is possible to secure an f/number of f/3 or brighter. In this case, if the azimuth angle of the TIR prism is in the range from −11° to −13°, the illumination light entering the TIR prism has an azimuth angle around 0°.

By contrast, when the azimuth angle and the angle of incidence of the illumination light striking the display panel are 40° or more and 17° or less respectively, it is possible only to secure an f/number as dim as f/4. When the azimuth angle and the angle of incidence are 15° or less and 45° or more respectively, the angle of reflection of the "on" reflected light exiting from the display panel is 30° or more, and thus, even if the projection optical system is built as a decentered optical system, it is difficult to correct aberrations. That is, here, the projection optical system needs to be so designed as to have the principal ray within the range of angles from 3° to 30° with respect to the perpendicular to the surface of the display panel. To conclude, assuming that the azimuth angle of the micromirrors of the DMD (the angle between the plane perpendicular to the rotation axis about which the micromirrors rotate and the shorter sides of the display panels) is $\Phi$ and the inclination of the mirrors is $\theta$, the azimuth angle and the angle of incidence of the illumination light striking the display panel need to be in the range from $0.33\Phi$ to $0.9\Phi$ and in the range from $1.7\theta$ to $4.5\theta$ respectively.

FIG. 15 shows the ranges of angles of the illumination and projection light in the arrangement of the second embodiment described above. In this figure, as indicated by the circle 51, the azimuth angle of the illumination light entering the TIR prism 22 is about 148°, and the angle of incidence of the same light with respect to the display panel 16 is somewhat less than 90°. As indicated by the circle 52, the azimuth angle of the illumination light striking the display panel 16 is 90°, and the angle of incidence of the same light is somewhat less than 15°. As indicated by the circle 53, the azimuth angle of the "on" reflected light (projection light) exiting from the display panel 16 is 0°, and the angle of reflection of the same light is somewhat less than 15°. As indicated by the circle 54, the azimuth angle of the "off" reflected light exiting from the display panel 16 is somewhat more than 240°, and the angle of reflection of the same light is somewhat more than 30°.

As indicated by the arc 55, the azimuth angle of the TIR prism 22 is 155°, and the inclination of the total-reflection surface with respect to the display panel 16 is 43.50°. As shown in the figure, in the arrangement of the second embodiment, the beam of the illumination light striking the display panel 16, indicated by the circle 52, and the beam of the "on" reflected light (projection light) exiting from the display panel 16, indicated by the circle 53, are located close to each other, and they are barely separated by the TIR prism 22 indicated by the arc 55. Thus, here, it is not possible to use a bright lens having a small f/number. Moreover, the illumination light entering the TIR prism 22 cannot be directed thereto from a direction along the shorter side "c" of the display panel 16. Thus, it is not possible to make the TIR prism smaller.

Nevertheless, in this embodiment, the "off" reflected light exiting from the display panel, indicated by the circle 54, can be brought into the region for reflected light of the total-reflection surface of the TIR prism 22. Thus, it is possible to totally reflect the "off" reflected light in the TIR prism 22 so that it is not transmitted therethrough. This makes it possible to prevent the "off" reflected light from reaching the projection optical system and thereby eliminate flare on the screen. To conclude, assuming that the azimuth angle of the micromirrors is Φ and the inclination of the mirrors is θ, the azimuth angle and the angle of incidence of the illumination light striking the display panel need to be in the range from 1.8Φ to 3Φ and in the range from 1θ to 2θ respectively.

Here, when the azimuth angle and the angle of incidence are 1.8Φ or less and 1θ or less respectively, as long as the "off" reflected light is totally reflected in the TIR prism, it is possible only to secure an f/number as dim as f/4. When the azimuth angle and the angle of incidence are 3Φ or more and 2Φ or more respectively, the angle of reflection of the "on" reflected light (projected light) exiting from the display panel is 30° or more, and thus, even if the projection optical system is built as a decentered optical system, it is difficult to correct aberrations. That is, here, the projection optical system needs to be so designed as to have the principal ray within the range of angles from 10° to 30° with respect to the perpendicular to the surface of the display panel.

Where, as in the first and second embodiments described above, the pitch of the microlenses (or microcylinderlenses) is far greater than the pixel pitch, it is preferable, from the perspective of electrical control, to determine the pitch of the microlenses to be equal to the pixel pitch multiplied by a multiple of 8. In digital processing, it is common to handle 8 bits as the minimum unit. As will be understood from FIG. 2 and other figures, the microlenses are illuminated with light having the same phase for every pitch of the microlenses. Therefore, determining the pitch of the microlenses otherwise makes digital control difficult.

Figure 16:
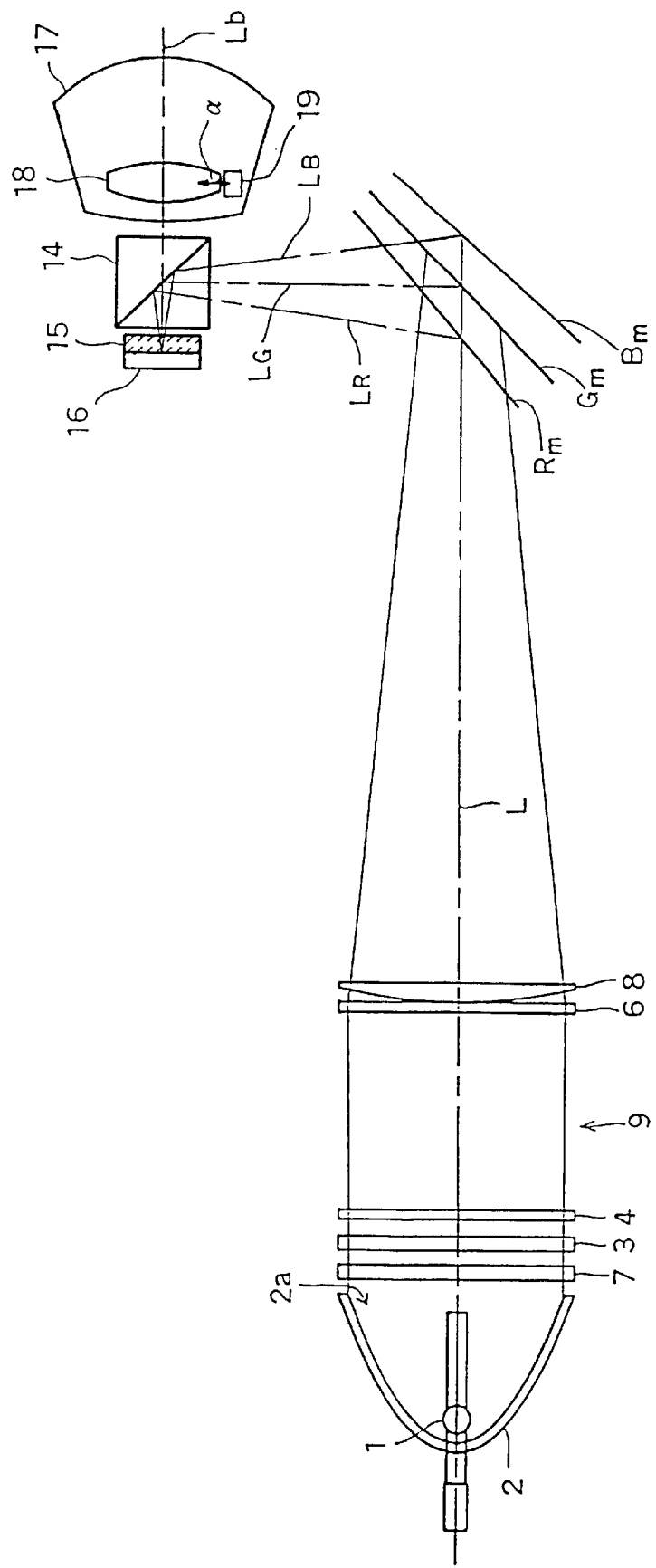
FIG. 16 is a diagram schematically showing the construction of a display optical apparatus of a third embodiment of the invention.

FIG. 16 is a diagram schematically showing the construction of the display optical apparatus of a third embodiment of the invention. In this figure, reference numeral 1 represents a light source, and reference numeral 2 represents a reflector disposed so as to surround the light source 1. Reference numeral 7 represents a UV/IR cut filter disposed so as to cover the light exit opening 2a of the reflector 2 to cut the ultraviolet and infrared radiation included in the light emitted from the light source 1 and reflected from the reflector 2. Behind the UV/IR cut filter 7 (i.e., in the figure, on the right side thereof are disposed, from the UV/IR cut filter side, a birefringent diffraction grating 3, a first lens array 4, then somewhat away therefrom, a second lens array 6, and then immediately behind it, a superimposing lens 8.

Though not shown here, the first lens array 4 has lens cells arranged in a formation shaped like a grid, and the second lens array 6 has lens cells arranged in a formation shaped like a rectangular grid divided along different directions from the first lens array 4. The birefringent diffraction grating 3 performs polarization separation on the light 9 corning from the light source 1 and the reflector 2 to separate the light 9 in the direction of the longer sides of the individual lens cells of the second lens array 6. The light 9 coming from the light source 1 and the reflector 2 is, while traveling through the birefringent diffraction grating 3, the first lens array 4, and then the second lens array 6, subjected to polarization conversion and thereby its polarization plane is made uniform. Thus, these optical elements together constitute a polarization conversion device. The relationship among these optical elements will be described in detail later.

The second lens array 6 and the superimposing lens 8 disposed immediately behind it allow the images formed on the individual lens cells of the first lens array 4 to be superimposed on one another in the vicinity of the focal point (described later) of the superimposing lens 8. The superimposing lens 8 may be formed integrally with the second lens array 6. Instead of using the birefringent diffraction grating 3, it is also possible to dispose a birefringent prism array or the like between the first and second lens arrays 4 and 6. The optical elements described above, starting with the first lens array 4 and ending with the superimposing lens 8, together constitute an integrator optical system having an optical axis L. At the focal point of the superimposing lens 8, a display panel 16 is disposed.

Between the superimposing lens 8 and a display panel 16, dichroic mirrors $R_m$, $G_m$, and $B_m$ that reflect light of the frequency ranges corresponding to R (red), G (green), and B (blue), respectively, and that thus serve as a color separation device re disposed with different inclinations. Behind the dichroic mirrors (i.e., in the figure, above them), a PBS (polarization beam splitter) prism 14 is disposed. Thus, the light 9 having passed through the first superimposing lens 8 along the optical axis L is reflected by the dichroic mirrors $R_m$, $G_m$, and $B_m$ individually so as to pass through the PBS prism 14 and then reach the display panel 16 by traveling along differently inclined optical axes $L_R$, $L_G$, and $L_B$, respectively. Instead of the dichroic mirror $B_m$, it is also possible to use a total-reflection mirror. In the figure, the light that appears as a result of the light 9 being reflected from the dichroic mirrors is omitted.

The PBS prism 14 reflects S-polarized light and transmits P-polarized light. The light 9 coming from the light source 1 and the reflector 2 is, as a result of the polarization conversion mentioned above, almost wholly S-polarized when it enters the PBS prism 14. Thus, most of the light 9 is reflected by the PBS prism 14 and is thereby directed to the display panel 16 disposed on the left side thereof in the figure.

Immediately in front of the display panel 16, a birefringent microlens array 15 is disposed. This microlens array may be a microcylinderlens array (of a lenticular type having a lens-shaped section). The light 9 having been subjected to color separation achieved by the above-mentioned dichroic mirrors then illuminates, as illumination light, the display panel 16 through this birefringent microlens array 15 in such a way that light of different colors illuminates different pixels, as will be described in detail later. As a result, the display panel 16 as a whole is illuminated by recurrent stripes of R, G, and B light and thereby the display data of those three colors is displayed individually by the pixels illuminated by the light of the corresponding colors.

The display panel 16 is a reflection-type liquid crystal display panel that reflects pixel by pixel the light shone thereon with (for "on" pixels) or without (for "off" pixels) rotating the polarization plane thereof in accordance with the given display data. Here, the "off" reflected light remains S-polarized, and therefore, when it returns through the microlens array 15 to the PBS prism 14, it is reflected by the PBS prism 14 so as to be directed back toward the light source. On the other hand, the "on" reflected light is converted into P-polarized light, and therefore, when it returns through the microlens array 15 to the PBS prism 14, it is transmitted through the PBS prism 14 so as to be directed further to a projection optical system 17. As the reflection-type liquid crystal display panel, in particular in cases where, for example, a quick response is required, a ferro-electric liquid crystal (FLC) display panel is used that achieves modulation by varying the directions of its birefringence axes. The projection optical system 17 has an optical axis Lb.

This projection optical system 17 projects the display data presented on the display panel 16 onto a screen (not shown). Part of the lens elements included in the projection lens unit constituting the projection optical system 17 are, as an image shift lens 18, driven at high speed in a direction perpendicular to the optical axis Lb, as indicated by an arrow α, by an actuator 19. This helps enhance the resolution of the display data, as will be described in detail later.

Figure 17:
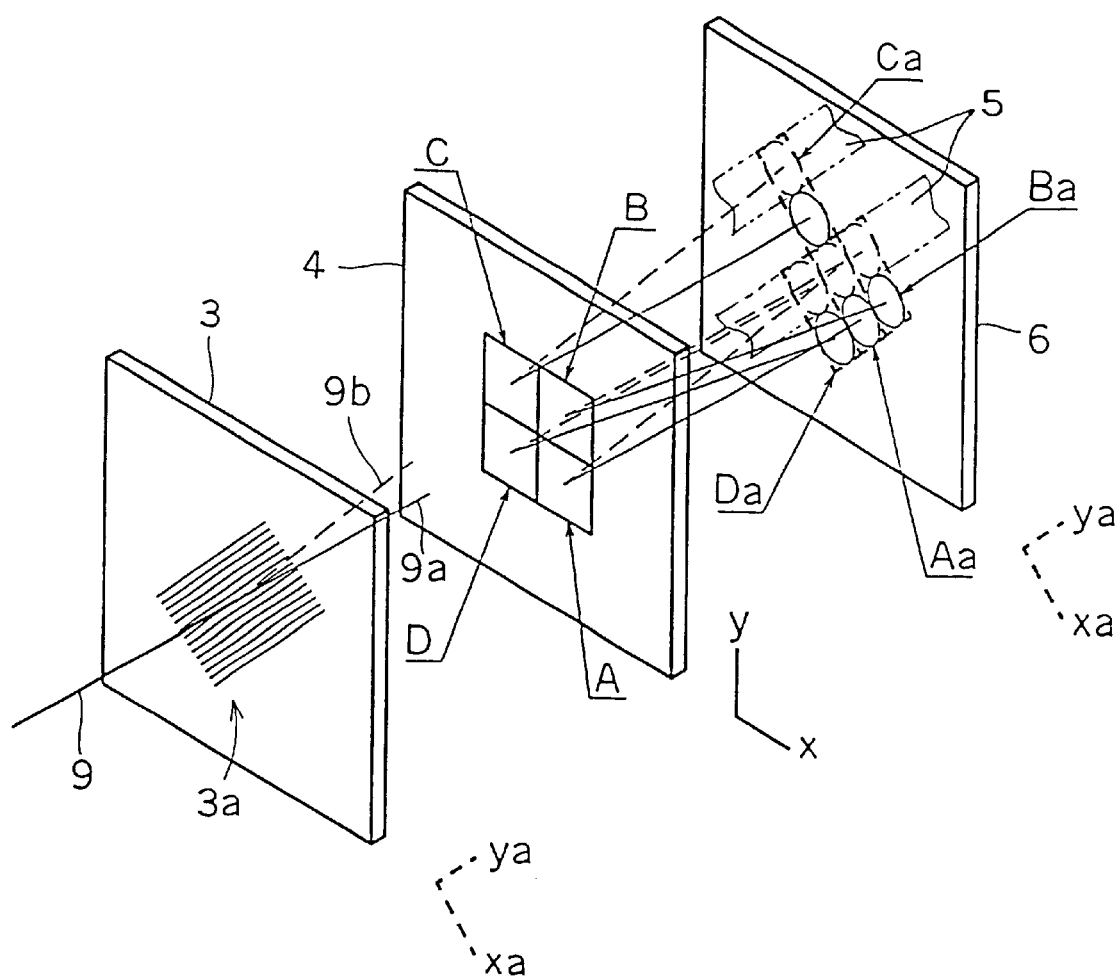
FIG. 17 is an exploded perspective view schematically showing the relationship between the birefringent diffraction grating and the first and second lens arrays in the third embodiment.

FIG. 17 is an exploded perspective view schematically showing the relationship among the birefringent diffraction grating and the first and second lens arrays in this embodiment. In this figure, only part of the lens cells constituting the lens arrays are shown as their representatives. As shown in this figure, in this embodiment, the directions of the sides of the individual lens cells of the first lens array 4 (indicated by solid lines) are not aligned with the directions of the sides of the individual lens cells of the second lens array 6 (indicated by broken lines). On the other hand, the direction of the blazes (grooves) 3a of the birefringent diffraction grating 3 are aligned with one of the directions of the sides of the individual lens cells of the second lens array 6. Specifically, the directions of the sides of the individual lens cells of the second lens array 6 are aligned with the directions of the diagonals of the individual lens cells of the first lens array 4.

The light 9 coming from the light source 1 and the reflector 2, which are disposed on the lower left side of the figure but not shown here, is separated, by the polarization separation action of the blazes 3a of the birefringent diffraction grating 3, into light 9a having a predetermined polarization plane, indicated by solid lines, and light 9b having a polarization plane perpendicular thereto, indicated by broken lines. These two types of light pass through the individual lens cells A, B, C, and D arranged in a grid-like formation in the first lens array 4 and then form, on each of the individual lens cells Aa, Ba, Ca, and Da arranged in a rectangular grid-like formation in the second lens array 6 and divided along different directions from the first lens array 4, a pair of a light-source image having the predetermined polarization plane and a light-source image having the polarization plane perpendicular thereto.

To achieve proper projection of the light-source images from the lens cells A, B, C, and D, arranged in one way, to the lens cells Aa, Ba, Ca, and Da, arranged in a different way therefrom, the individual lens cells A, B, C, and D of the first lens array 4 are each so arranged as to have a slight inclination or have a decentered lens vertex; that is, the vertex of these lens cells is deviated from the center thereof. Similarly, the individual lens cells Aa, Ba, Ca, and Da of the second lens array 6 are each so arranged as to have a slight inclination or have a decentered lens vertex.

In each pair, the two light-source images lie apart from each other in an exact row along the direction in which the birefringent diffraction grating 3 separates the light, i.e. in the direction of the longer sides of the individual lens cells of the second lens array 6. Moreover, as indicated by solid-line and broken-line ellipses (circles if seen from the front side of the lens array), these light-source images are projected on the individual lens cells of the second lens array 6 in such a way as to have an appreciable size. It is to be noted that, in the example under discussion, with respect to the first lens array 4 as seen from the light source side, a coordinate system is assumed to have a y axis pointing upward and an x axis pointing rightward, and, with respect to the second lens array 6 as seen from the light source side, a coordinate system is assumed to have a ya axis pointing toward the upper right and an xa axis pointing toward the lower right along the sides of the individual lens cells.

This arrangement makes it possible to minimize the overlap between the light-source images projected on the second lens array 6, and thus to perform polarization conversion efficiently. Here, it is possible to make uniform the polarization plane of the separated light-source images, for example, by attaching strip-shaped half-wave plates 5 along the rows of the light-source images indicated by the broken-line ellipses. It is to be noted that, in this embodiment, the light source has the same size and the lens cells of the second lens array 6 have the same area as in a conventional construction where the individual lens cells of the first and second lens arrays are arranged in the same way (with their sides aligned in the same directions).

Figure 18:
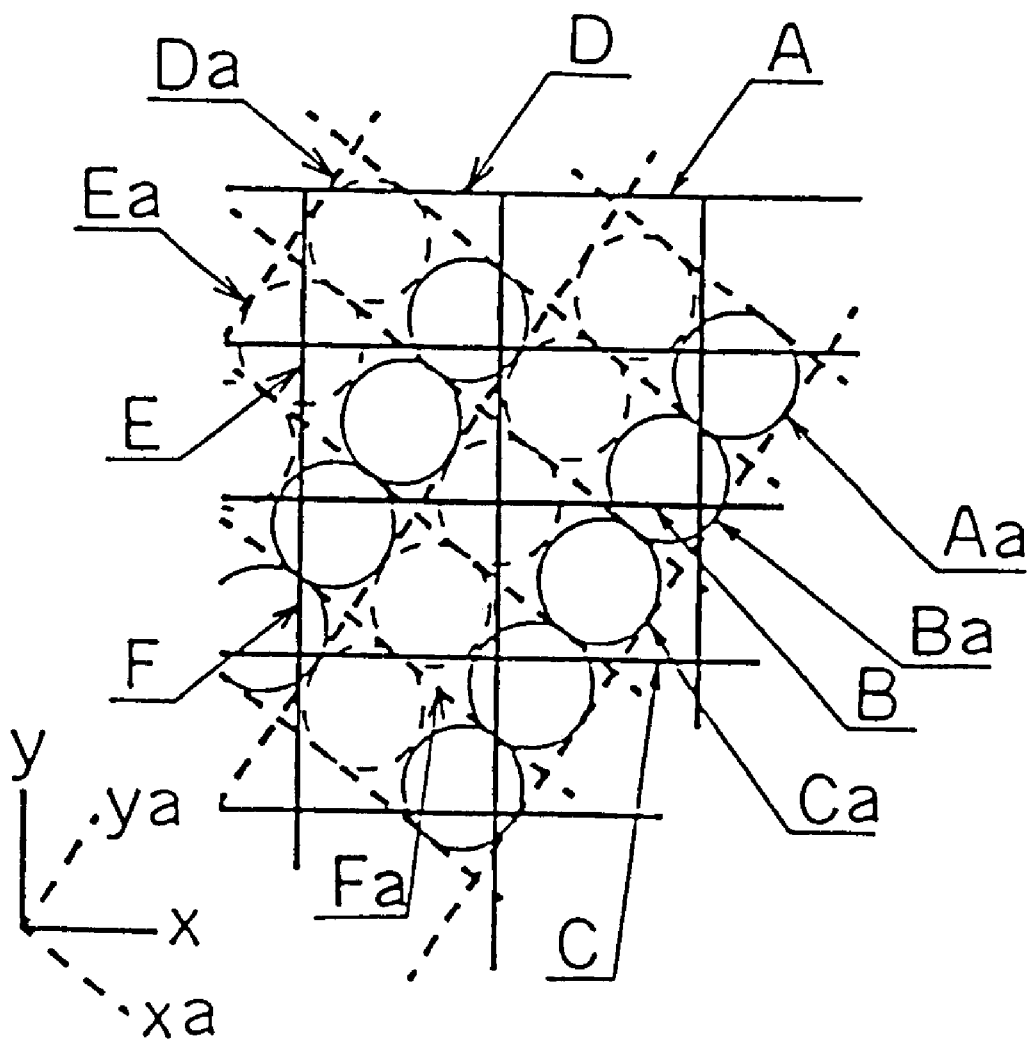
FIG. 18 is a front view schematically showing the positional relationship between the first and second lens arrays when a single-stage integrator is used in the third embodiment.

In a case where only a one-stage integrator is employed as in this embodiment, the first lens array 4 needs to have lens cells that are so shaped as to have an aspect ratio nearly equal to that of the display panel 16. Even in this case, by arranging the individual lens cells of the first lens array 4 and those of the second lens array 6 with their sides aligned in different directions, it is possible to achieve higher illumination efficiency than in a conventional construction where the sides are aligned in the same directions. FIG. 18 is a front view schematically showing the positional relationship between the first and second lens arrays in a case where only a one-stage integrator is used, assuming that the aspect ratio is 4:3. As shown in this figure, one of the directions of the diagonals of the individual lens cells, indicated by solid lines, of the first lens array 4 coincides with the direction of the longer sides of the individual lens cells, indicated by broken lines, of the second lens array 6.

The light 9 coming from the light source 1 and the reflector 2 (neither is shown here) is separated, by the polarization separation action of the birefringent diffraction grating 3 (not shown), into light having a predetermined polarization plane and light having a polarization plane perpendicular thereto. These two types of light pass through the individual lens cells A, B, C, D, E, and F arranged in a grid-like formation having an aspect ratio of 4:3 in the first lens array 4 and then form, on each of the individual lens cells Aa, Ba, Ca, Da, Ea, and Fa arranged in a rectangular grid-like formation in the second lens array 6 and divided along different directions from the first lens array 4, a pair of a light-source image having the predetermined polarization plane and a light-source image having the polarization plane perpendicular thereto.

In each pair, the two light-source images lie apart from each other in an exact row along the direction in which the birefringent diffraction grating 3 separates the light. Moreover, as indicated by solid-line and broken-line circles, these light-source images are projected on the individual lens cells of the second lens array 6 in such a way as to have an appreciable size. It is to be noted that, in the example under discussion, with respect to the first lens array 4 as seen from the light source side, a coordinate system is assumed to have a y axis pointing upward and an x axis pointing rightward, and, with respect to the second lens array 6 as seen from the light source side, a coordinate system is assumed to have a ya axis pointing toward the upper right and an xa axis pointing toward the lower right along the sides of the individual lens cells.

In this embodiment, as shown in FIG. 17, the direction in which the birefringent diffraction grating 3 exhibits birefringence is aligned with the direction along which the blazes 3*a* are formed, i.e. the ya-axis direction, and therefore the two types of light 9*a* and 9*b* after separation by polarization, indicated by solid and broken lines, respectively, and thus the two types of light-source images resulting therefrom, indicated by solid and broken ellipses, respectively, have polarization planes along the xa-axis and ya-axis directions, respectively. Before the two types of light enter the next optical system, their polarization planes need to be made to point uniformly in the y-axis direction. To achieve this, to the individual rows of the two types of light-source images, two corresponding types of strip-shaped half-wave plates are attached that have optical axes intersecting each other at 45°. In this way, the polarization planes of the two types of light are made uniform simultaneously.

As another way to make the polarization planes uniform, it is also possible, by the use of strip-shaped half-wave plates attached to the rows of one of the two types of light-source images, to make the polarization plane thereof uniform with that of the other, and then, by the use of a half-wave plate attached over the entire surface of the second lens array 6, to make the polarization planes of both types of light point in the y-axis direction. The direction in which the birefringent diffraction grating 3 exhibits birefringence may be aligned not with the direction along which the blazes 3*a* are formed, i.e. the direction of the longer or shorter sides of the individual lens cells of the second lens array 6, but with the direction of the longer or shorter sides of the individual lens cells of the first lens array 4. Polarization separation may be achieved by any other method than by using a birefringent diffraction grating.

Figure 19:
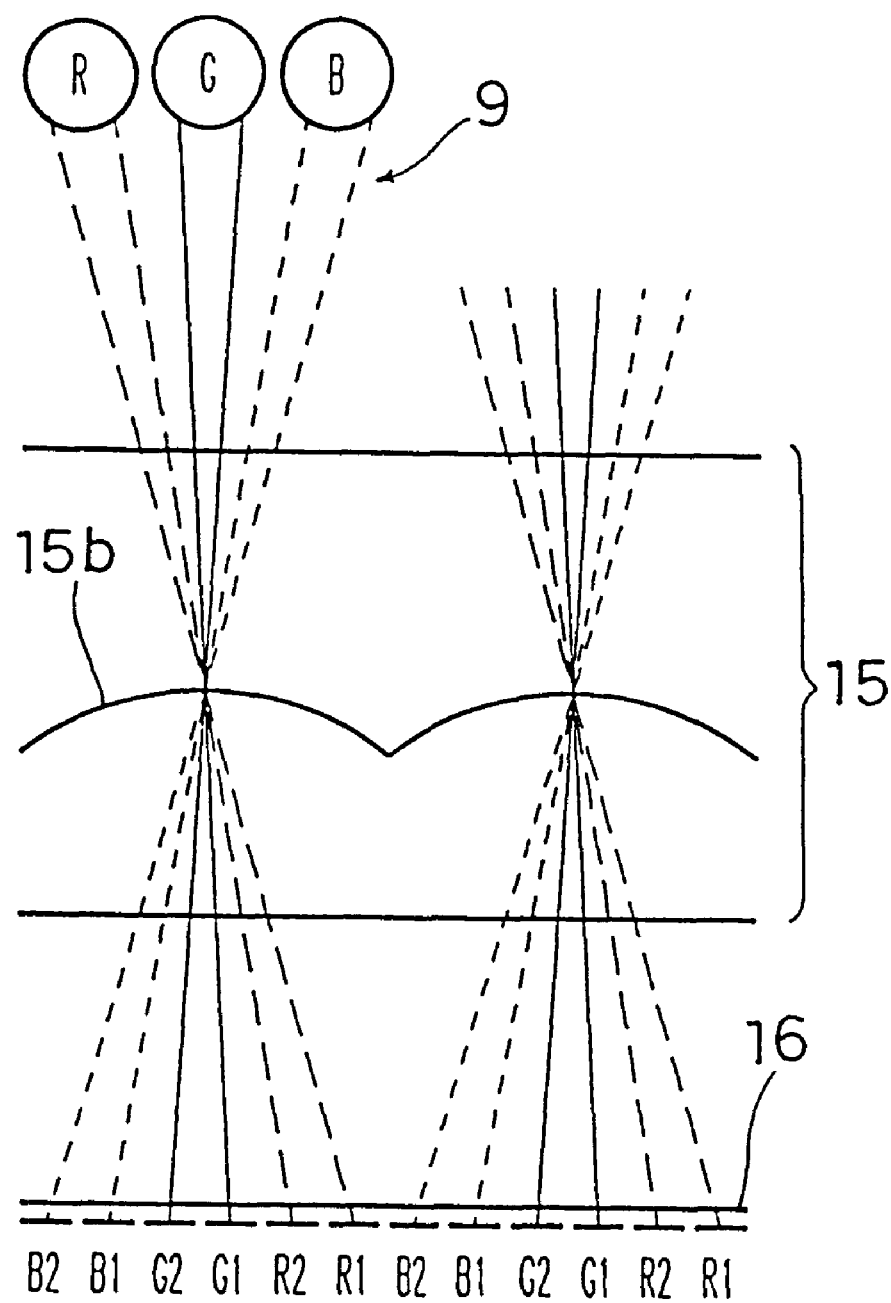
FIG. 19 is a diagram schematically showing the relationship between the birefringent microlens array and the display panel in the third embodiment.

FIG. 19 is a diagram schematically showing the relationship between the birefringent microlens array and the display panel in this embodiment. As shown also in FIG. 16, immediately in front of the display panel 16, the birefringent microlens array 15 made of a birefringent material is disposed. Through this birefringent microlens array 15, the light 9 separated into R, G, and B light by the dichroic mirrors illuminates the display panel 16 in such a way that light of each color illuminates a plurality of contiguous, identical pixels. In this embodiment, every two pixels arranged next to each other are identical, and two identical pixels of one color are arranged next to two identical pixels of another color, specifically in the order R1, R2, G1, G2, B1, B2, and so forth.

Here, the light 9 is shone into the individual microlenses 15*b* of the birefringent microlens array 15 in such a way that R, G, and B light is focused, at different angles, on the individual pixels R1, R2, G1, G2, B1, and B2 on the display panel 16, with light of each color striking a plurality of (here, two) pixels such that a group of 2 pixels×3 colors is handled as one unit. By arranging a plurality of identical pixels next to each other in this way, it is possible to lengthen the focal length of the individual microlenses and thereby realize an arrangement that offers satisfactory illumination efficiency. It is to be noted that this figure shows only parts of the birefringent microlens array 15 and the display panel 16, i.e. the remaining parts thereof extending further rightward and leftward are omitted.

Figure 20:
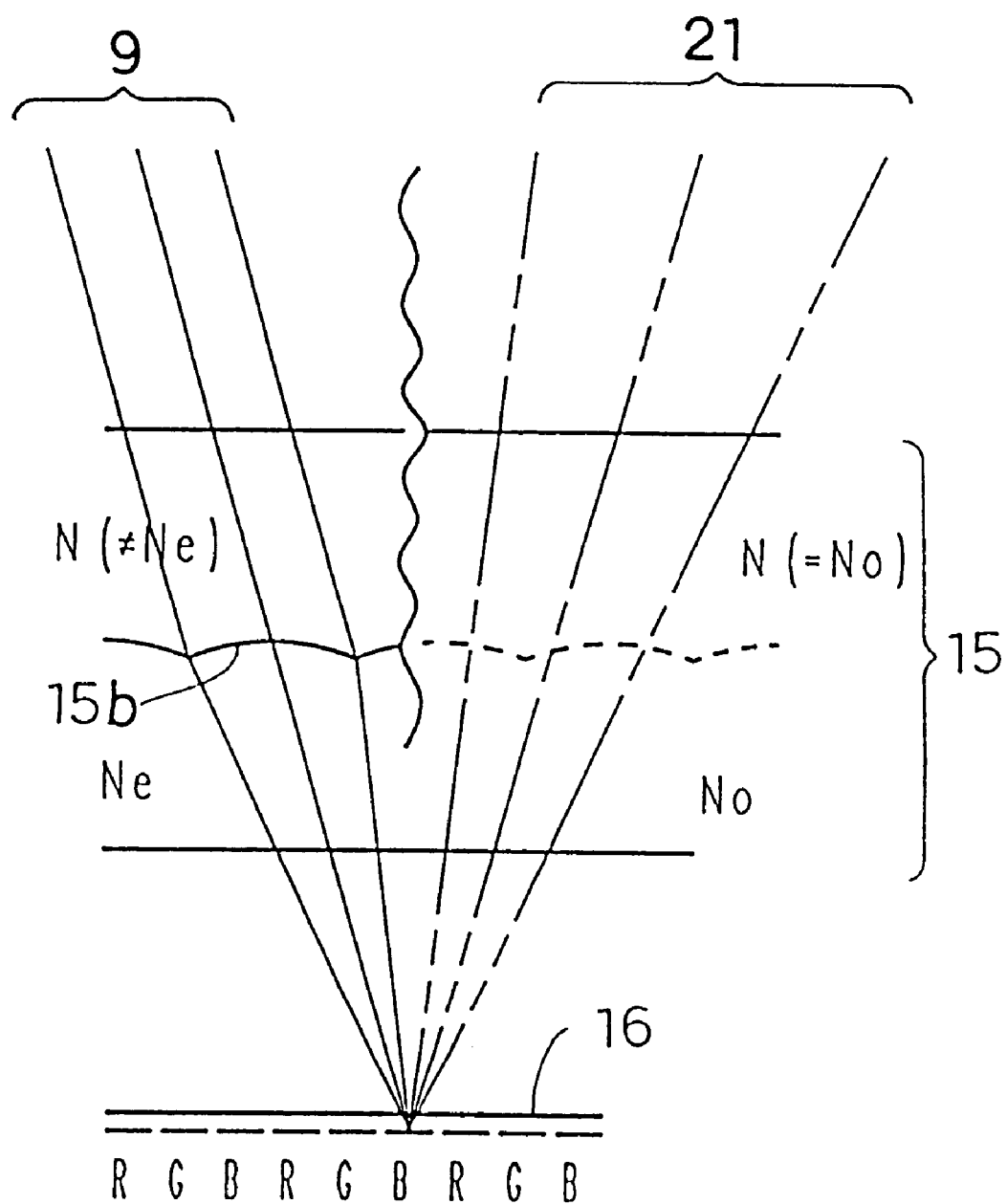
FIG. 20 is a diagram schematically showing the material structure of the birefringent microlens array used in the third embodiment.

FIG. 20 is a diagram schematically showing the structure of the material of the birefringent microcylinderlens array. In this embodiment, a reflection-type liquid crystal display panel is used as the display panel 16, and therefore both the light 9 (illumination light) traveling toward the display panel 16 and the light 21 (projection light) reflected from the display panel 16 pass through the birefringent microcylinderlens array 15 disposed immediately in front of the display panel 16. Whereas the light 9 traveling toward the display panel 16 behaves as described above, the light 21 reflected therefrom, if left as it is, is disturbed by the birefringent microcylinderlens array 15, and this degrades image quality.

To cope with this, in this embodiment, the birefringent microcylinderlens array 15 is made of an isotropic optical material and a birefringent optical material. In FIG. 20, whereas the light 9 traveling toward the display panel 16 has a particular polarization plane, for example a polarization plane perpendicular to the plane of the figure, the light 21, i.e. the portion of the reflected light that is used to display an image, has a polarization plane rotated relative thereto, for example a polarization plane along the plane of the figure.

Here, suppose that, of the materials of which the birefringent microcylinderlens array 15 is made, the isotropic optical material, which is used above the microcylinderlenses 15*b*, has a refractive index N, and the birefringent optical material, which is used below the microcylinderlenses 15*b*, exhibits a refractive index Ne for the polarization plane of the light 9 and a refractive index No for the polarization plane of the light 21. Then, if N=No, the birefringent microcylinderlens array 15 acts as a microcylinderlens array toward the light 9 and acts as a simple transparent flat plate toward the light 21. In this way, despite the use of a reflection-type display panel, it is possible to prevent degradation of the image quality of the light 21.

In FIG. 20, to make the point easier to grasp, the light 9 is illustrated as striking the display panel 16 from an oblique direction and then reflecting as the light 21 in an oblique direction on the opposite side. However, in reality, the principal optical axes of both of the light 9 and 21 are perpendicular to the display panel 16. It is to be noted that this figure shows only parts of the birefringent microcylinderlens array 15 and the display panel 16, i.e. the remaining parts thereof extending further rightward and leftward are omitted. The optical elements thus far described, starting with the light source 1 and ending with the birefringent microcylinderlens array 15, together constitute an illumination optical system.

Figure 21:
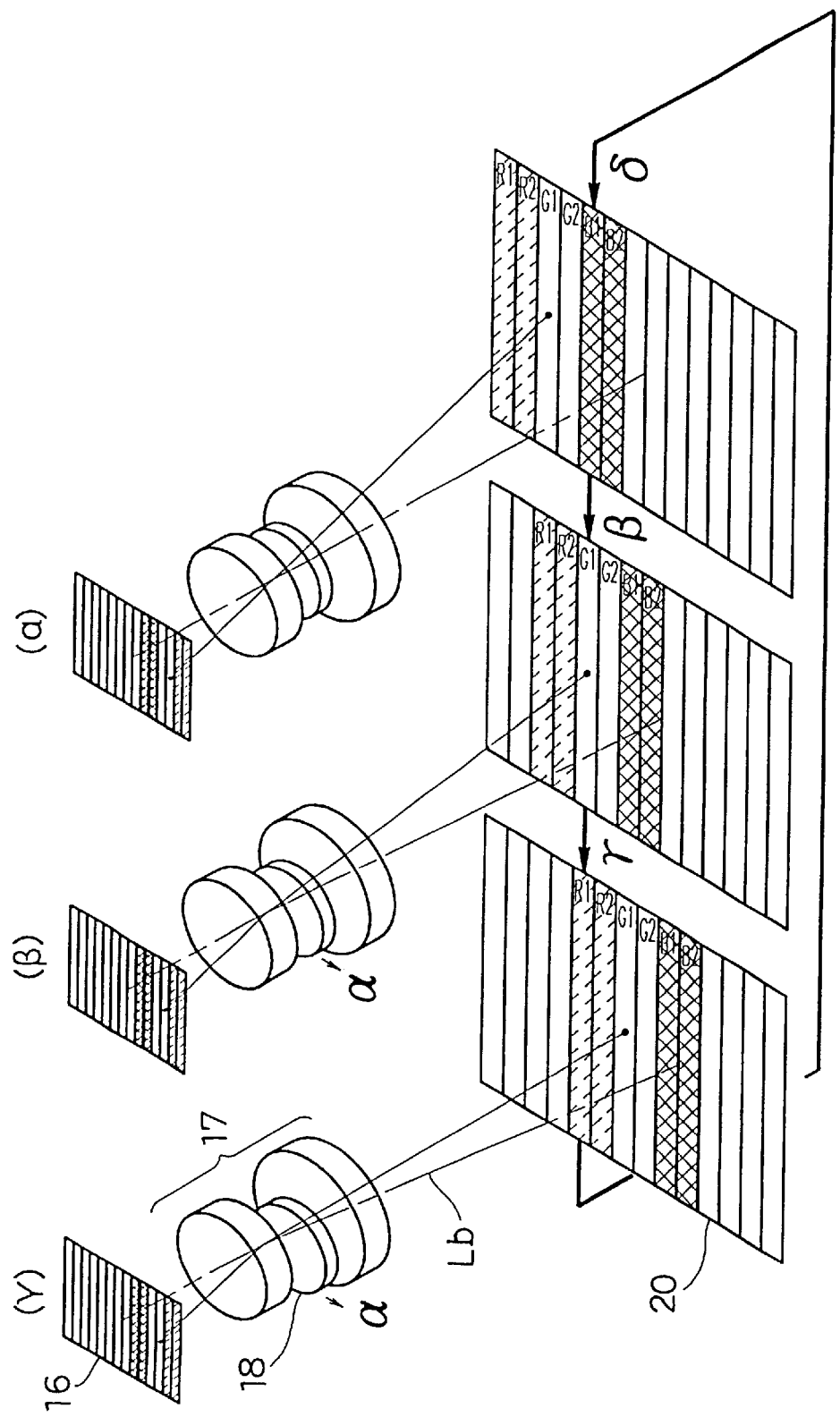
FIG. 21 is a perspective view schematically showing the principle of pixel shifting performed in the projection optical system in the third embodiment.
Figure 22:
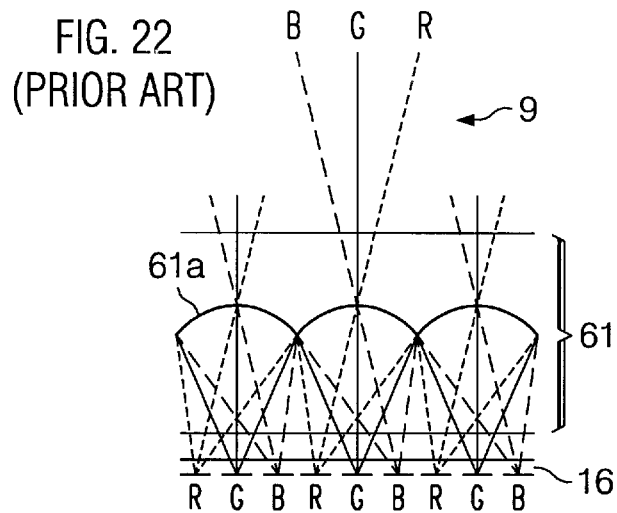
FIG. 22 is a diagram schematically showing the relationship between the microlens array and the display panel as a conventional example.
Figure 23:
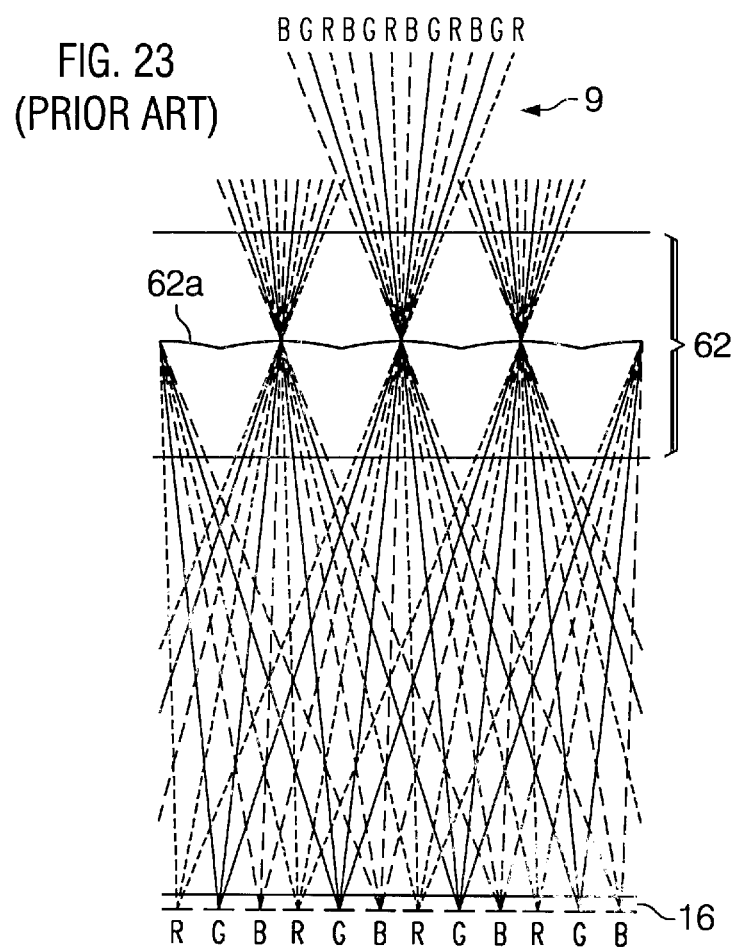
FIG. 23 is a diagram schematically showing the relationship between the microlens array and the display panel as another conventional example.

FIG. 21 is a perspective view schematically showing the principle of pixel shifting performed in the projection optical system. In this embodiment, only a single display panel 16 is used. Therefore, to achieve display with resolution corresponding to the XGA format (1024 by 768 pixels), as many pixels are needed for each of R, G, and B colors, and thus the single display panel theoretically needs to have three times the number of pixels required in the XGA format. This makes the display panel unduly large and expensive. To avoid this, although a single display panel is used that has just so many pixels as required in the XGA format, colored display in the XGA format is achieved by shifting the pixels displayed on the screen at high speed.

Specifically, part of the lenses constituting the projection optical system 17 shown in the figure are, as an image shift lens 18, driven at high speed in a direction perpendicular to the optical axis Lb as indicated by arrows α in such a way that, if attention is concentrated on the rows on the screen 20 that are initially allotted to B1 and B2 as shown at (α) in the figure, the same rows are then (as indicated by an arrow β) allotted to G1 and G2 as shown at (β), then (as indicated by an arrow γ) allotted to R1 and R2 as shown at (γ), then (as indicated by an arrow δ) allotted to B1 and B2 again as shown at (α), and so forth. In this way, three states are switched cyclically from one to the next at high speed, and what is displayed is changed accordingly as the states are switched so that color display is achieved by chronologically superimposing shifted images.

The image shift lens 18 is driven by the actuator 19 shown in FIG. 16 through a stroke of the same order as the pixel size, i.e. from 10 μm to tens of micrometers, at a time. As the actuator, for example an MC (moving coil), MM (moving magnet), or the like is used because it offers a high output and is thus suitable for high-speed driving.

The pixel shifting described above is shown below as Example 1:

| | |
|---|---|
| R1 R2 G1 G2 B1 B2 . . . . . . . . | (First Frame) |
| . . . . R1 R2 G1 G2 B1 B2 . . . . | |
| . . . . . . . . R1 R2 G1 G2 B1 B2 | |
| R1 R2 G1 G2 B1 B2 . . . . . . . . | (Second Frame) |

In this example, pixels on the screen are shifted a plurality of pixels of identical colors at a time; that is, pixels are shifted in three stages within one frame, and are then brought back to their original positions at the first stage of the next frame. However, in this method, uneven intensity of the illumination light results in uneven brightness between pixels of identical colors in different positions (for example between R1 and R2).

This can be prevented by the method shown below as Example 2:

| | |
|---|---|
| R1 R2 G1 G2 B1 B2 . . . . . . . . . . | (First Frame) |
| . . R1 R2 G1 G2 B1 B2 . . . . . . . . | |
| . . . . R1 R2 G1 G2 B1 B2 . . . . . . | |
| . . . . . . R1 R2 G1 G2 B1 B2 . . . . | |
| . . . . . . . . R1 R2 G1 G2 B1 B2 . . | |
| . . . . . . . . . . R1 R2 G1 G2 B1 B2 | |
| R1 R2 G1 G2 B1 B2 . . . . . . . . . . | (Second Frame) |

In this example, pixels on the screen are shifted in such a way that pixels of identical colors in different positions are superimposed on one another; that is, pixels are shifted in six stages within one frame, and are then brought back to their original positions at the first stage of the next frame. This helps suppress uneven brightness, but requires frequent shifting of pixels.

Another method of pixel shifting that requires less frequent shifting of pixels while suppressing uneven brightness is shown below as Example 3:

| | |
|---|---|
| R1 R2 G1 G2 B1 B2 . . . . . . . . . . | (First Frame) |
| . . . . R1 R2 G1 G2 B1 B2 . . . . . . | |
| . . . . . . . . R1 R2 G1 G2 B1 B2 . . | |
| . . R1 R2 G1 G2 B1 B2 . . . . . . . . | (Second Frame) |
| . . . . . . R1 R2 G1 G2 B1 B2 . . . . | |
| . . . . . . . . . . R1 R2 G1 G2 B1 B2 | |
| R1 R2 G1 G2 B1 B2 . . . . . . . . . . | (Third Frame) |

In this example, pixels on the screen are first shifted a plurality of pixels of identical colors at a time; that is, pixels are shifted in three stages within one frame. Then, at the first stage of the second frame, pixels are brought back to positions where pixels of identical colors in different positions are superimposed on one another, and therefrom pixels are shifted in three stages in the same manner as in the first frame. Then, at the first stage of the third frame, pixels are brought back to their original positions. Although the examples described above deal with cases where two pixels of identical colors are arranged next to each other, it is possible to arrange any number of pixels of identical colors next to one another. Moreover, pixel shifting may be performed in any manner other than specifically described above.

Figure 24:
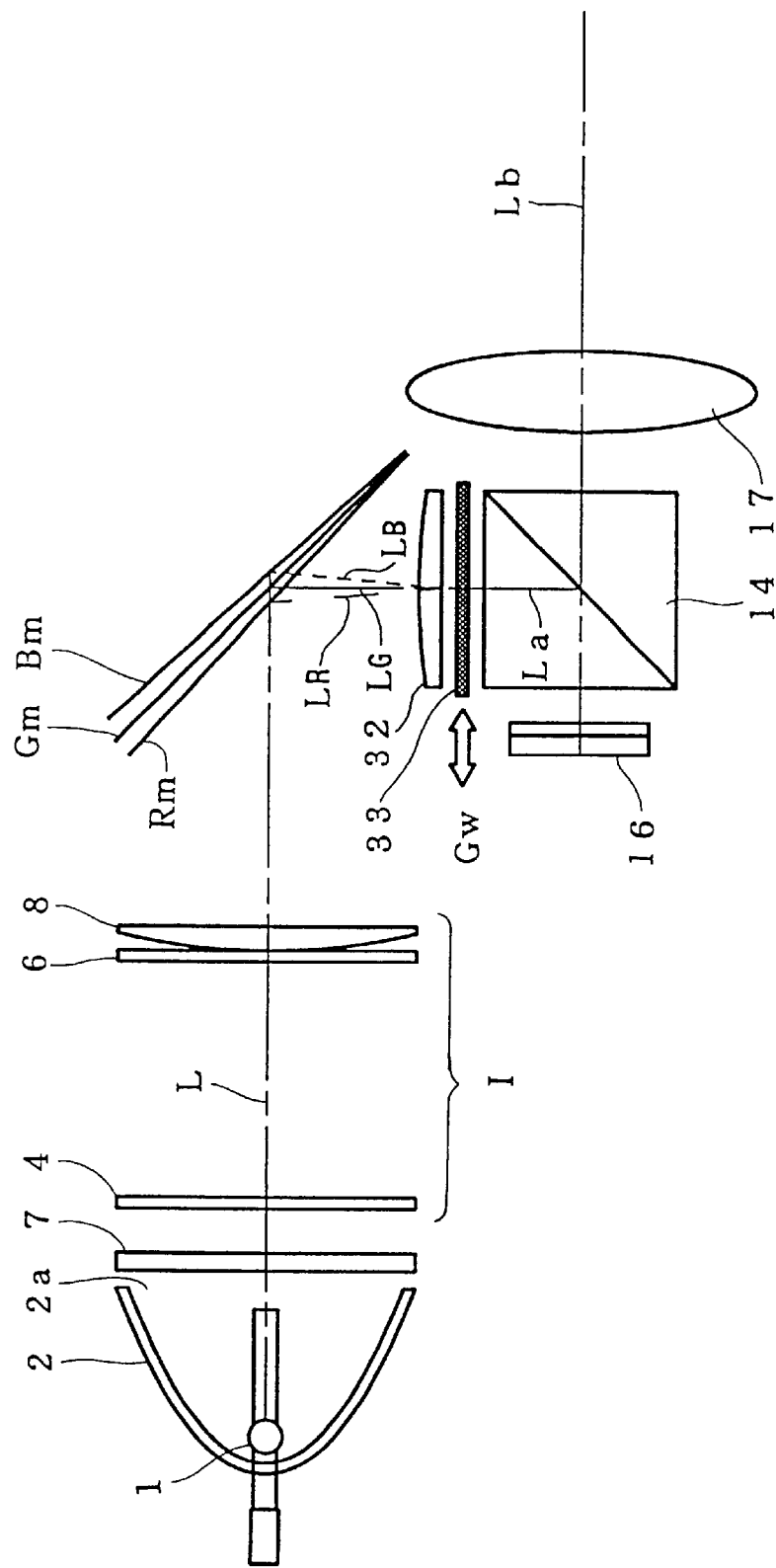
FIG. 24 is a diagram schematically showing the construction of a display optical apparatus of a fourth embodiment of the invention.

FIG. 24 is a diagram schematically showing the construction of the display optical apparatus of a fourth embodiment of the invention. It is to be noted that, in reality, the individual optical elements constituting it are arranged three-dimensionally but, in this figure, they are illustrated two-dimensionally for easier understanding. In this figure, reference numeral 1 represents a light source, and reference numeral 2 represents a reflector disposed so as to surround the light source 1. Reference numeral 7 represents a UV/IR cut filter disposed so as to cover the light exit opening 2a of the reflector 2 to cut the ultraviolet and infrared radiation included in the light emitted from the light source 1 and reflected from the reflector 2.

Behind the UV/IR cut filter 7 (i.e., in the figure, on the right side thereof) are disposed, from the UV/IR cut filter side, a first lens array 4, then somewhat away therefrom, a second lens array 6, and then immediately behind it, a superimposing lens 8. Though not shown here, the first lens array 4 has lens cells arranged in a grid-like formation, and the second lens array 6 has lens cells arranged in a grid-like formation that is different from that of the first lens array 4. The ratio between the length of the longer sides and the length of the shorter sides of the individual lens cells are the same as that of the display surface of the display panel described later; that is, the lens cells are geometrically similar to the display surface. Between the second lens array 6 and the superimposing lens 8 is disposed a mask plate 31 that will be described later.

The first lens array 4 has a birefringent diffraction grating, which performs polarization separation on the light 9 coming from the light source 1 and the reflector 2 to separate the light 9 in the direction of the shorter sides of the individual lens cells of the second lens array 6. The light 9 (not shown) coming from the light source 1 and the reflector 2 is, while traveling through the first lens array 4 and the second lens array 6, subjected to polarization conversion and thereby its polarization plane is made uniform. Thus, these optical elements together constitute a polarization conversion device. The relationship among these optical elements will be described in detail later.

The second lens array 6 and the superimposing lens 8 disposed immediately behind it allow the images formed on the individual lens cells of the first lens array 4 to be superimposed on one another on the display panel described later. The superimposing lens 8 may be formed integrally with the second lens array 6. The optical elements described above, starting with the first lens array 4 and ending with the superimposing lens 8, together constitute an integrator optical system I having an optical axis L. At the focal point of the superimposing lens 8, a condenser lens 32 is disposed. Alternatively, to achieve higher illumination efficiency, the display panel may be disposed at the composite focal point of the superimposing lens 8 and the condenser lens 32. For simplicity's sake, in this embodiment, the former arrangement is adopted.

Between the superimposing lens 8 and the condenser lens 32, dichroic mirrors $R_m$, $G_m$, and $B_m$ that reflect light of the frequency ranges corresponding to R (red), G (green), and B (blue), respectively, and that thus serve as a color separation device are disposed with different inclinations. Thus, the light 9 having passed through the UV/IR cut filter 7 along the optical axis L is reflected by the dichroic mirrors $R_m$, $G_m$, and $B_m$ individually so as to reach the condenser lens 32 disposed behind (i.e., in the figure, below) by traveling along differently inclined optical axes $L_R$, $L_G$, and $L_B$ (indicated by a broken, a solid, and a dotted line), respectively. Instead of the dichroic mirror $B_m$, it is also possible to use a total-reflection mirror.

Behind the condenser lens 32 (i.e., in the figure, below it), a microcylinderlens array 33 is disposed. This microcylinderlens array may be a microlens array. Further behind, a PBS (polarization beam splitter) prism 14 is disposed. This PBS prism 14 reflects S-polarized light and transmits P-polarized light. The light 9 coming from the light source 1 and the reflector 2 is, as a result of the polarization conversion mentioned above, almost wholly S-polarized when it enters the PBS prism 14 along the optical axis La.

Thus, most of the light 9 is reflected by the PBS prism 14 and is thereby directed to the display panel 16 disposed on the left side thereof in the figure. The light 9 having been subjected to color separation achieved by the above-mentioned dichroic mirrors then illuminates, as illumination light, the display panel 16 through the microcylinderlens array 33 in such a way that light of different colors illuminates different pixels, as will be described in detail later. As a result, the display panel 16 as a whole is illuminated by recurrent stripes of R, G, and B light and thereby the display data of those three colors is displayed individually by the pixels illuminated by the light of the corresponding colors. The arrangement described so far provides an example of an illumination optical apparatus.

The display panel 16 is a reflection-type liquid crystal display panel employing a device that offers quick on/off response such as a ferroelectric liquid crystal or high-speed TN-type liquid crystal display panel. The display panel 16 reflects pixel by pixel the light shone thereon with (for "on" pixels) or without (for "off" pixels) rotating the polarization plane thereof in accordance with the given display data. Here, the "off" reflected light remains S-polarized, and therefore, when it returns to the PBS prism 14, it is reflected by the PBS prism 14 so as to be directed back toward the light. source.

On the other hand, the "on" reflected light is converted into P-polarized light, and therefore, when it returns to the PBS prism 14, it is transmitted through the PBS prism 14 so as to be directed, as projection light 21, further to a projection optical system 17 along the optical axis Lb. Through this projection optical system 17, the display data presented on the display panel 16 is projected on the screen (not shown). In the figure, the light 21 is omitted. The arrangement of the projection optical system and the screen described above provides an example of a projection optical apparatus.

Figure 25:
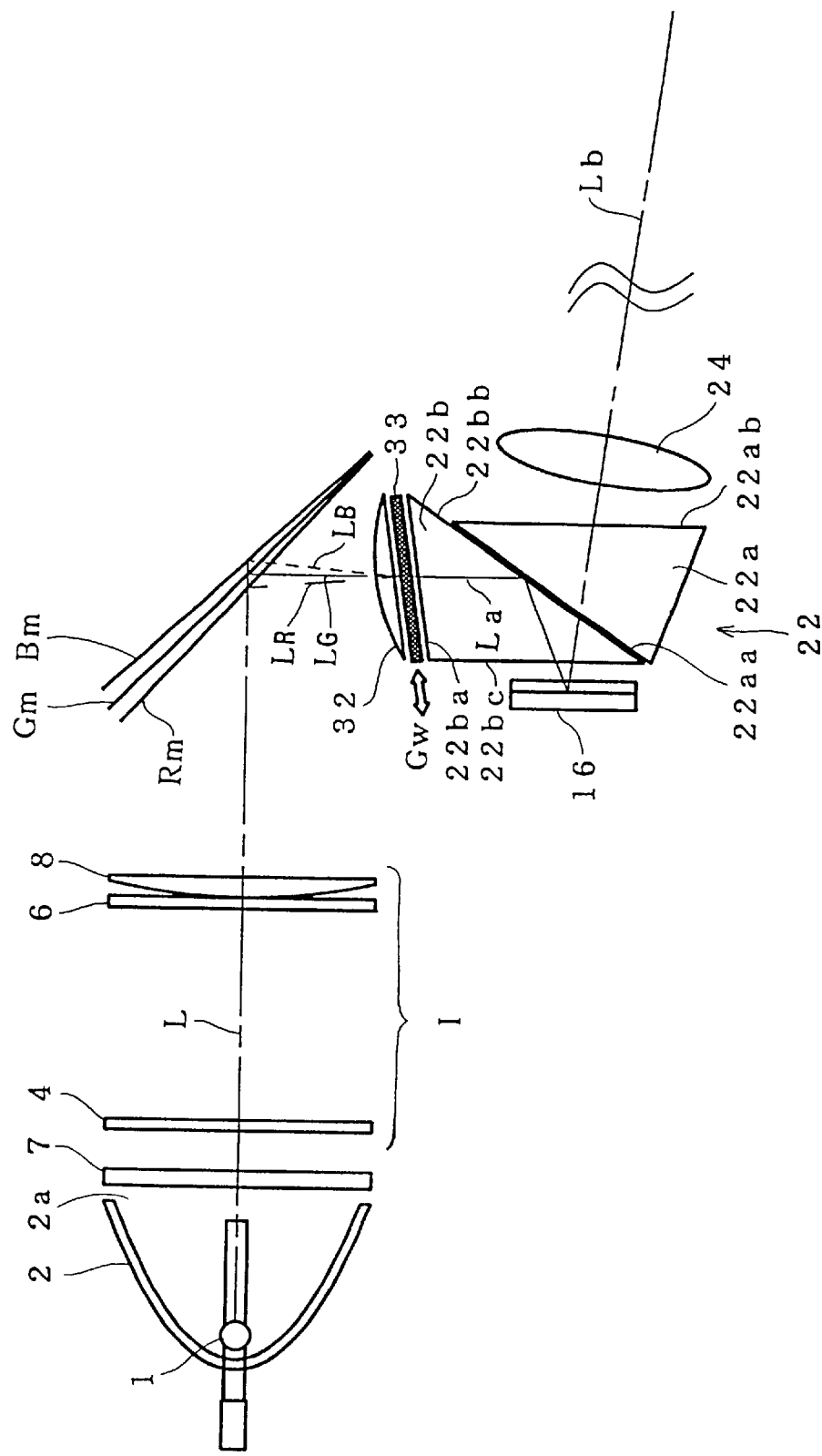
FIG. 25 is a diagram schematically showing the construction of a display optical apparatus of a fifth embodiment of the invention.

FIG. 25 is a diagram schematically showing the construction of the display optical apparatus of a fifth embodiment of the invention. It is to be noted that, in reality, the individual optical elements constituting it are arranged three-dimensionally but, in this figure, they are illustrated two-dimensionally for easier understanding. In this figure, reference numeral 1 represents a light source, and reference numeral 2 represents a reflector disposed so as to surround the light source 1. Reference numeral 7 represents a UV/IR cut filter disposed so as to cover the light exit opening 2a of the reflector 2 to cut the ultraviolet and infrared radiation included in the light emitted from the light source 1 and reflected from the reflector 2.

Behind the UV/IR cut filter 7 (i.e., in the figure, on the right side thereof) are disposed, from the UV/IR cut filter side, a first lens array 4, then somewhat away therefrom, a second lens array 6, and then immediately behind it, a superimposing lens 8. Though not shown here, the first lens array 4 has lens cells arranged in a grid-like formation, and the second lens array 6 has lens cells arranged in a grid-like formation that is different from that of the first lens array 4. The ratio between the length of the longer sides and the length of the shorter sides of the individual lens cells are the same as that of the display surface of the display panel described later; that is, the lens cells are geometrically similar to the display surface. Between the second lens array 6 and the superimposing lens 8 is disposed a mask plate 31 that will be described later.

The second lens array 6 and the superimposing lens 8 disposed immediately behind it allow the images formed on the individual lens cells of the first lens array 4 to be superimposed on one another on the display panel described later. The superimposing lens 8 may be formed integrally with the second lens array 6. The optical elements described above, starting with the first lens array 4 and ending with the superimposing lens 8, together constitute an integrator optical system I having an optical axis L. At the focal point of the superimposing lens 8, a condenser lens 32 is disposed.

Between the superimposing lens 8 and the condenser lens 32, dichroic mirrors $R_m$, $G_m$, and $B_m$ that reflect light of the frequency ranges corresponding to R red), G (green), and B (blue), respectively, and that thus serve as a color separation device are disposed with different inclinations. Thus, the light 9 having passed through the UV/IR cut filter 7 along the optical axis L is reflected by the dichroic mirrors $R_m$, $G_m$, and $B_m$ individually so as to reach the condenser lens 32 disposed behind (i.e., in the figure, below) by traveling along differently inclined optical axes $L_R$, $L_G$, and $L_B$ (indicated by a broken, a solid, and a dotted line), respectively. Instead of the dichroic mirror $B_m$, it is also possible to use a total-reflection mirror.

Behind the condenser lens 32 (i.e., in the figure, below it), a microcylinderlens array 33 is disposed. This microcylinderlens array may be a microlens array. Behind the microcylinderlens array 33, a TIR prism 22 is disposed. The TIR prism 22 is composed of two prisms 22b and 22a, each having the shape of a triangular prism and made of glass or the like, that are arranged so as to face each other at predetermined sides of their surfaces. The prism 22b has an entrance surface 22ba, a total-reflection surface 22bb serving also as an exit surface, and an entrance/exit surface 22bc; the prism 22a has an entrance surface 22aa and an exit surface 22ab. The total reflection surface 22bb and the entrance surface 22aa, at which the two prisms face each other, are arranged with a gap of several micrometers to several tens of micrometers secured between them.

The light 9 from the light source 1 and the reflector 2, having passed through the condenser lens 32, is directed along the optical axis La to the prism 22b so that the light 9 enters the prism 22b through the entrance surface 22ba thereof. Then, most of the light 9, striking the total-reflection surface 22bb at angles of incidence greater than the critical angle, is reflected therefrom, exits from the prism 22b through the entrance/exit surface 22bc thereof, and travels, as illumination light, toward the display panel 16. The arrangement described so far provides an example of an illumination optical apparatus. The display panel 16 is a DMD that reflects pixel by pixel the light 9 shone thereon either with micromirrors in their "on" state or with micromirrors in their "off" state in accordance with the given display data. The "on" reflected light returns to the prism 22b, entering it through the entrance/exit surface 22bc thereof.

This light then strikes the total-reflection surface 22bb at angles of incidence smaller than the critical angle so as to be transmitted therethrough, is then transmitted through the prism 22a, entering it through the entrance surface 22aa thereof and exiting therefrom through the exit surface 22ab thereof, and then reaches, as projection light 21, a projection optical system 24 along the optical axis Lb. Through this projection optical system 24, the display data presented on the display panel 16 is projected on a screen (not shown). In the figure, the light 21 is omitted. On the other hand, the "off" reflected light, even though it is transmitted through the prisms 22b and 22a, is eventually directed in a direction that does not lead to the projection optical system 24.

The arrangement of the projection optical system and the screen described above provides an example of a projection optical apparatus. As the display panel 16, it is also possible to use a ferroelectric liquid crystal or high-speed TN-type liquid crystal display panel instead of a DMD. In that case, one or more polarizer plates need to be provided additionally. Specifically, polarizer plates are arranged on the illumination-light-entrance side and on the projection-light-exit side of the TIR prism 22 with their polarization planes optically perpendicular to each other; or alternatively, a polarizer plate is disposed between the TIR prism 22 and the display panel 16.

Figure 26A:
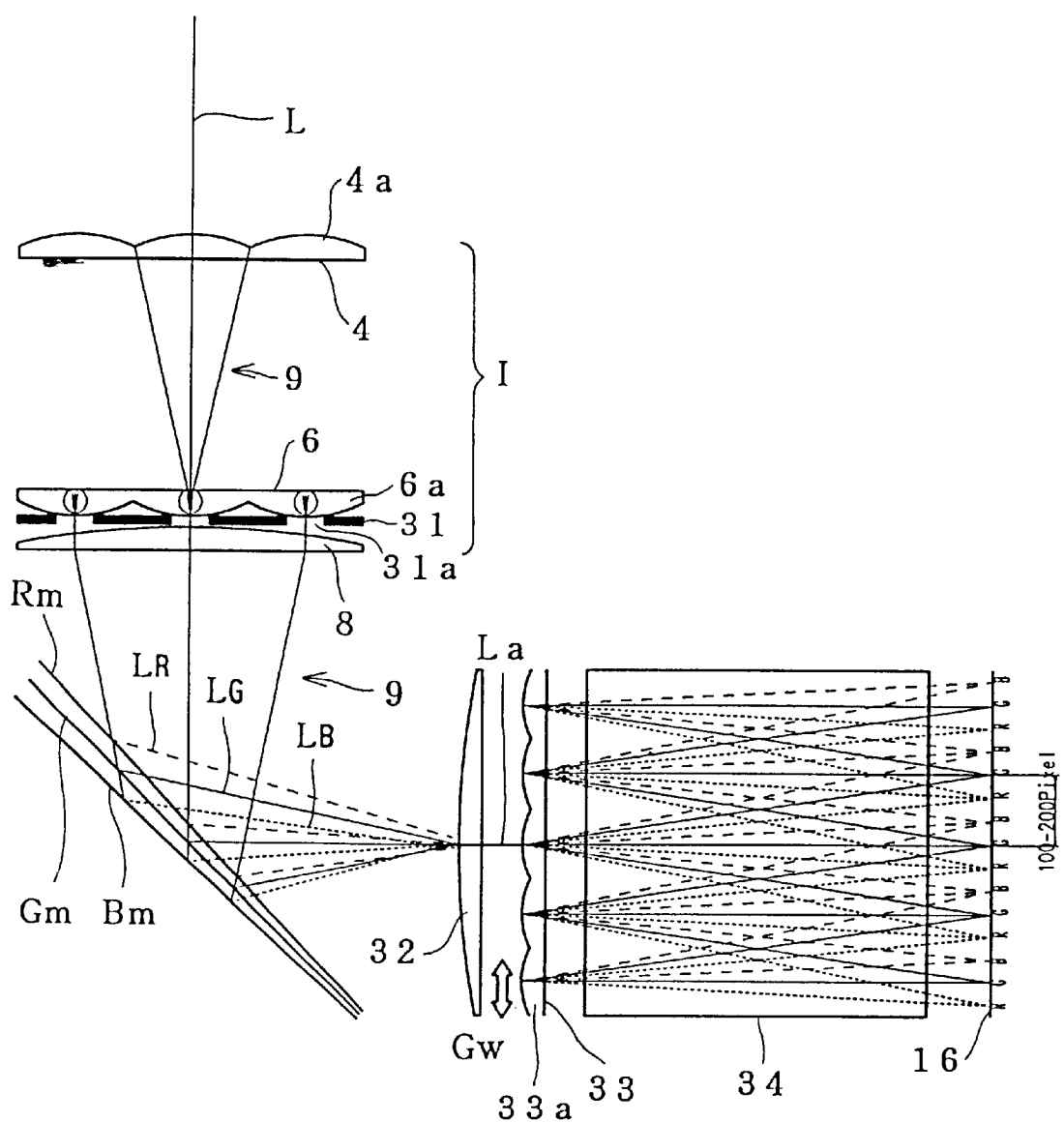
FIGS. 26A and 26B are enlarged views schematically showing a principal portion of the display optical apparatus of the fourth and fifth embodiments.
Figure 26B:
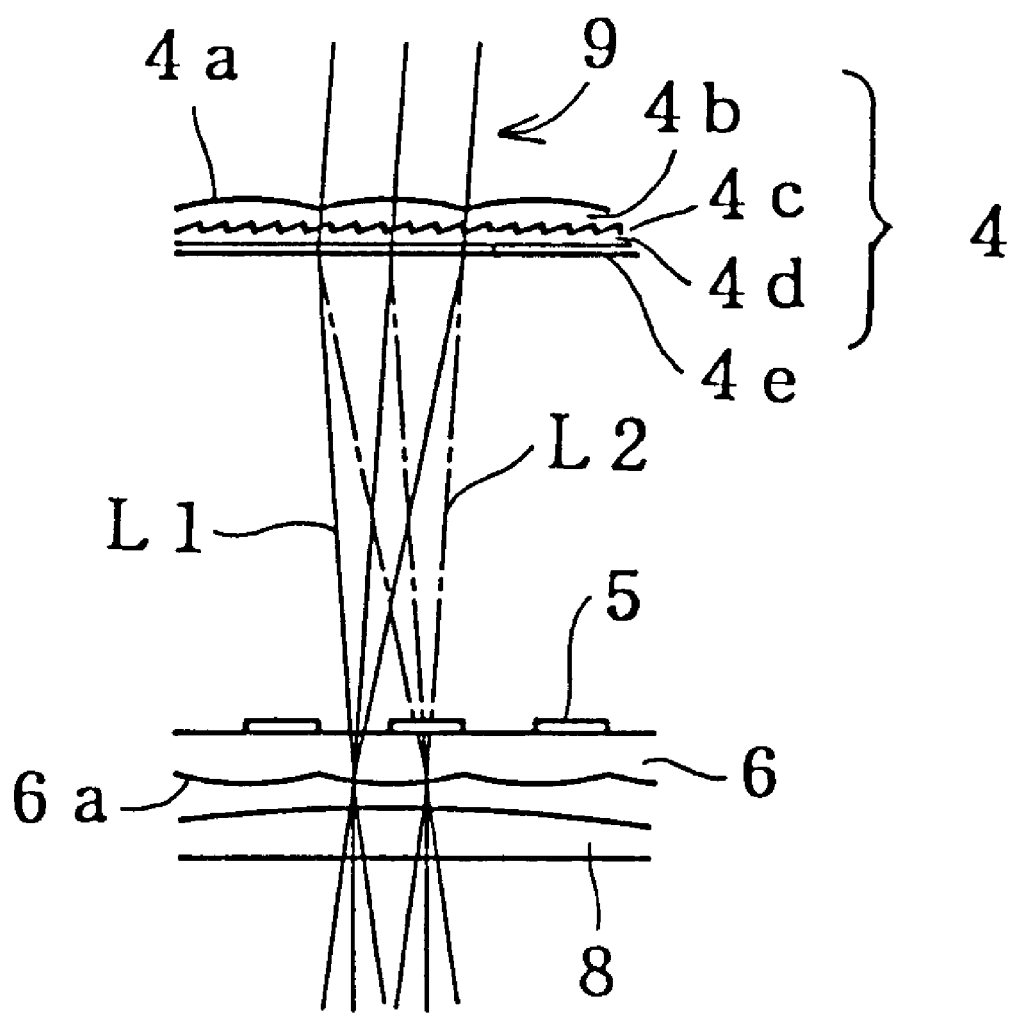

FIGS. 26A and 26B are enlarged views schematically showing a principal portion of the display optical apparatus of the fourth and fifth embodiments. Of these figures, FIG. 26A shows a general view, and FIG. 26B shows a side view of the portion corresponding to the integrator optical system mentioned above. As described already with reference to FIGS. 24 and 25, the light 9, traveling along the optical axis L, reaches the first lens array 4 of the integrator optical system I. Behind the first lens array 4 (i.e., in the figure, below it) are disposed, somewhat away therefrom, the second lens array 6, and then immediately behind it, the superimposing lens 8. Between the second lens array 6 and the superimposing lens 8 is disposed the mask plate 31, which has slits 31a serving as openings for restricting the aperture widths of the individual lens cells of the second lens array 6, as will be described in detail later.

The first lens array 4 has lens cells 4a arranged in a grid-like formation, and the second lens array 6 has lens cells 6a arranged in a grid-like formation that is different from that of the first lens array 4. All of these lens cells are arranged with their longer sides aligned with the horizontal direction as seen in FIG. 26A. The light 9 having reached the first lens array 4 is, through the individual lens cells 4a thereof, focused on the individual lens cells 6a of the second lens array 6 disposed somewhat away therefrom.

Moreover, as shown in FIG. 26B, the first lens array 4 has a birefringent diffraction grating, which performs polarization separation on the light 9 to separate it in the direction of the shorter sides of the individual lens cells of the second lens array 6. Thus, the light 9 is, while traveling through the first lens array 4 and the second lens array 6, subjected to polarization conversion and thereby its polarization plane is made uniform. The principle of polarization conversion here is the same as described with reference to FIG. 2B. However, a polarization conversion device like this is not necessary in the fifth embodiment shown in FIG. 25 that employs a DMD and a TIR prism.

Back in FIG. 26A, the second lens array 6 and the superimposing lens 8 disposed immediately behind it allow the images formed on the individual lens cells of the first lens array 4 to be superimposed on one another on the display panel 16 described later. The light 9 having exited from the superimposing lens 8 is reflected by the dichroic mirrors $R_m$, $G_m$, and $B_m$ individually so as to be separated into R, G, and B light and reach the condenser lens 32 disposed behind (i.e., in the figure, on the right) by traveling along differently inclined optical axes $L_R$, $L_G$, and $L_B$ (indicated by a broken, a solid, and a dotted line), respectively.

Then, the light 9, through the microcylinderlens array 33 and an illumination/projection separation optical system 34, illuminates the display panel 16 in such a way that, by the action of the individual microcylinderlenses 33a of the microcylinderlens array 33, light of different colors illuminates different pixels. The microcylinderlenses may be replaced with a diffractive lens. Here, the illumination/projection separation optical system 34 refers to an optical system that separates illumination light and projection light, such as the PBS prism 14 in the fourth embodiment shown in FIG. 24 and the TIR prism 22 in the fifth embodiment shown in FIG. 25.

In this way, by disposing the microcylinderlens array immediately in front of the illumination/projection separation optical system (i.e. on that side where the illumination light enters it), illumination is achieved in such a way that R, G, and B light each illuminates several contiguous pixels as one illuminated region. In addition, the microcylinderlens array 33 is driven along its surface with a fine pitch at a time or continuously within each frame as indicated by an arrow Gw in FIG. 26A, 24, or 25 in order to shift the illumination light on the pixels. By feeding display data to the pixels in synchronism with this shifting of the illumination light, it is possible to achieve satisfactory color display over the whole screen.

Figure 27:
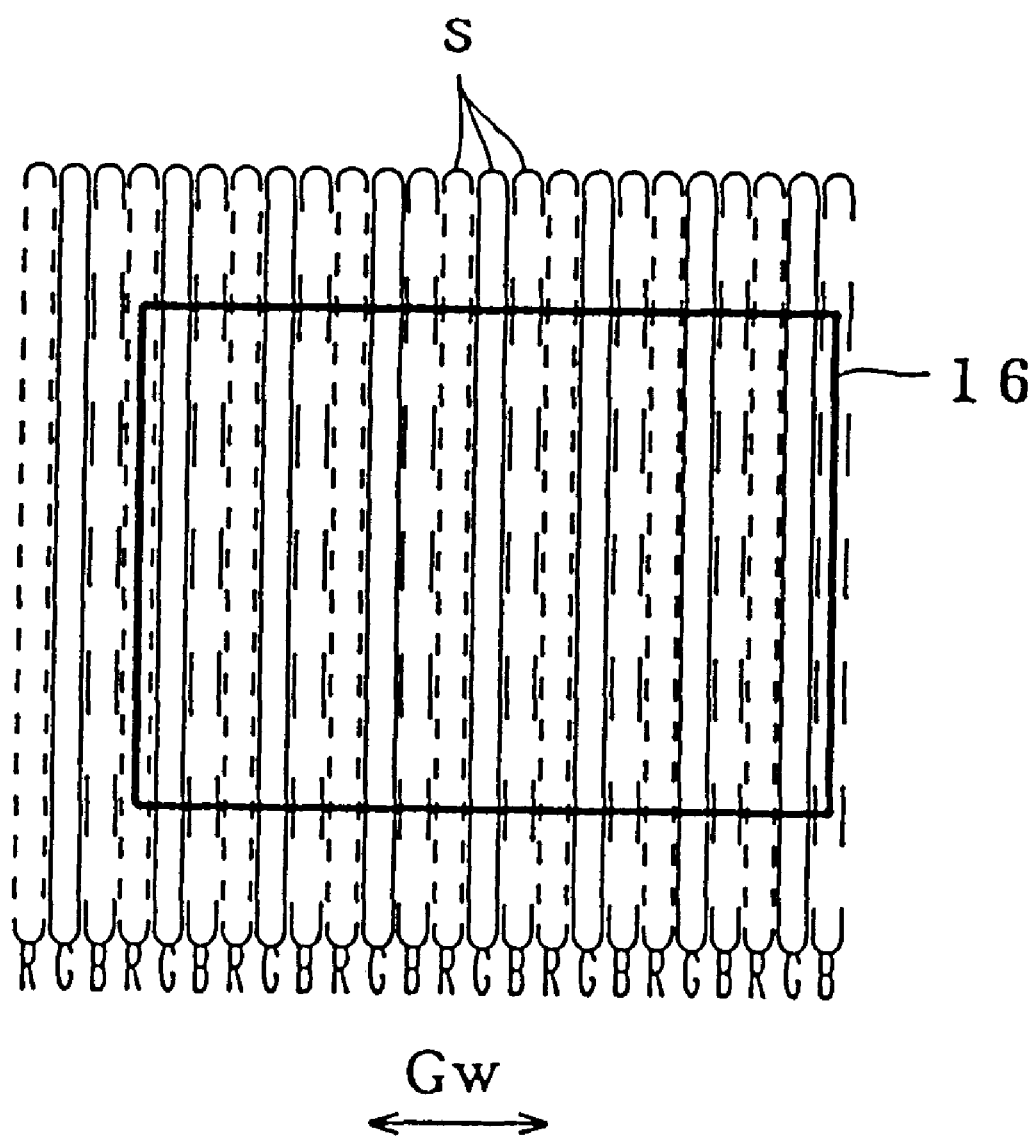
FIG. 27 is a diagram schematically showing how the display panel is illuminated with stripes of R, G, and B light in the display optical apparatus of the fourth and fifth embodiments.

Specifically, as shown in FIG. 27, the display panel 16 is illuminated with a recurring pattern of stripes of R, G, and B light (hereafter referred to simply as "stripes"), and those stripes are moved in the direction indicated by an arrow Gw with a cycle equal to the period of one frame. Here, the pitch of the stripes s is 1 to 2 mm, and is thus coarse relative to the size of the pixels of the display panel 16. In this way, the individual pixels are illuminated successively with R, G, and B light.

Figure 28B:
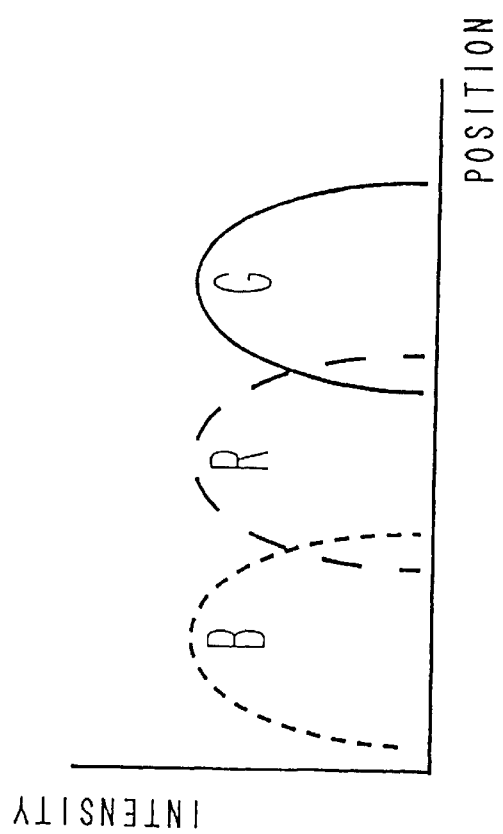
FIGS. 28A and 28B are diagrams schematically showing the structure of a mask plate.
Figure 28A:
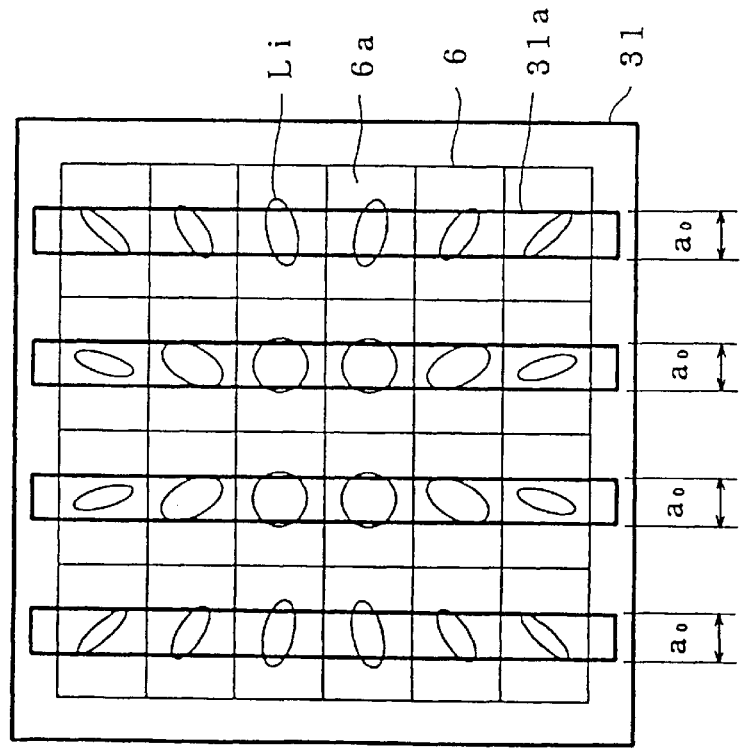

FIGS. 28A and 28B are diagrams schematically showing the structure of the mask plate 31 mentioned above. Of these figures, FIG. 28A shows the outline of the structure of the mask plate 31 and its positional relationship with the second lens array 6 as seen along the optical axis; FIG. 28B shows a graph showing the relationship between the position on the display panel and the intensity of the illumination light as seen on the plane of a lateral section of the stripes of the illumination light. In FIG. 28A, the second lens array 6 has its lens cells 6a arranged in a grid-like formation, and the lens array as a whole is substantially square. More specifically, four lens cells are arranged along the direction of their longer sides, and six lens cells are arranged along the direction of their shorter sides.

The lens cells 6a may be arranged in any other manner, for example in such a way that four to eight lens cells are arranged along the direction of their longer sides and, along the direction of their shorter sides, so many lens cells are arranged as is calculated from the ratio between the lengths of their longer and shorter sides so that the lens array as a whole is square. Here, the second lens array 6 has apertures only where the mask plate 31, laid over it, has its slits 31a. That is, light is transmitted only through those apertures. Specifically, each lens cell 6a of the second lens array 6 has its aperture only within a width $a_0$ that is one-third of its total width in the direction of the longer sides thereof. The slits may be formed either as openings or as transparent portions.

This structure makes it possible to restrict the width Li of the light-source image formed on each lens cell, and thus the width of the individual stripes of the illumination light shone on the display panel. Thus, theoretically, it is possible to prevent interference between adjacent stripes. However, in reality, due to errors, aberrations, and other factors, making the apertures one-third as wide as the lens cells does not result in sufficient restriction of the width of the stripes; that is, as shown in FIG. 28B, adjacent stripes, for example the B stripe indicated by a dotted-line and the R stripe indicated by a broken line, or the R stripe indicated by a broken-line and the G stripe indicated by a solid line, still interfere with each other partially, and thereby degrade color purity.

Figure 29B:
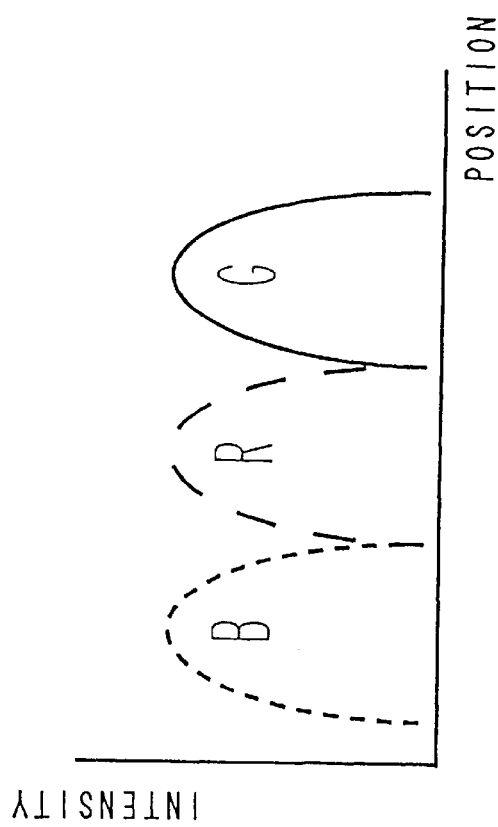
FIGS. 29A and 29B are diagrams schematically showing the structure of a mask plate with smaller aperture width.
Figure 29A:
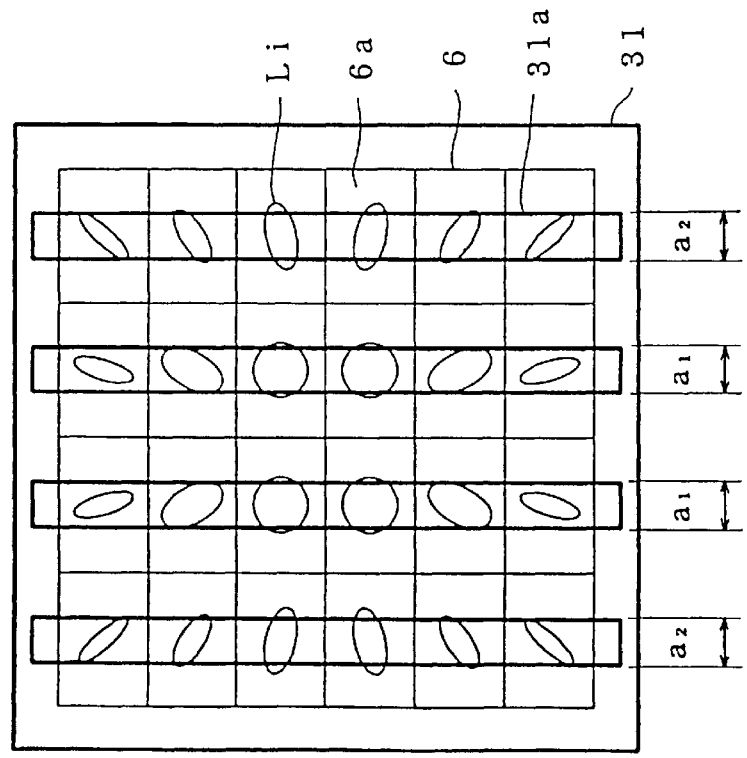

Therefore, the width of the apertures needs to be restricted further. FIGS. 29A and 29B are diagrams schematically showing the structure of a mask plate 31 having a smaller aperture width. Of these figures, FIG. 29A shows the outline of the structure of the mask plate 31 and its positional relationship with the second lens array 6 as seen along the optical axis; FIG. 29B shows a graph showing the relationship between the position on the display panel and the intensity of the illumination light as seen on the plane of a lateral section of the stripes of the illumination light as observed with this structure.

In FIG. 29A, assume that the aperture width of the slits 31a located in a central portion of the mask plate 31 is $a_1$ and that of the slits 31a located in peripheral portions thereof is $a_2$. Then, for example, $a_1$ is 9 0.7 to 0.95 times as great as $a_0$ given above, and $a_2$ is smaller than $a_1$. That is, slits 31a located closer to the periphery are given smaller aperture widths. The reason is as follows. On the lens array, the closer the lens cells are to the periphery, the smaller the light-source images Li formed thereon as a result of elliptic distortion caused by aberrations. Therefore, by restricting the aperture width more in this portion, it is possible to effectively restrict the width of the stripes while suppressing degradation of illumination efficiency. Thus, it is possible to prevent interference between adjacent stripes, and thereby prevent degradation of color purity.

With this structure, as shown in FIG. 29B, the width of the stripes is sufficiently restricted, with a result that adjacent stripes, for example the B stripe indicated by a dotted-line and the R stripe indicated by a broken line, or the R stripe indicated by a broken-line and the G stripe indicated by a solid line, no longer interfere with each other, nor are they located apart from each other. Thus, it is possible to achieve satisfactory illumination efficiency and color purity.

One way to achieve both satisfactory illumination efficiency and sufficient restriction of the width of the stripes more effectively is to use a density filter. That is, as shown in FIG. 30, each slit 31a of the mask plate 31 is so formed that, near both ends of its aperture width $a_0$, its transmittance decreases toward both ends. This makes it possible to more effectively restrict the width of the stripes while maintaining satisfactory illumination efficiency, and thereby prevent interference between stripes so as not to degrade color purity.

Another way is to make the aperture width of the slits variable. This can be achieved, for example as shown in FIG. 31, by laying a mask plate 31 indicated by solid lines and a mask plate 35 indicated by broken lines over each other. Here, the portions of the mask plates 31 and 35 where their respective slits 31a and 35a overlap are used as actual slits.

In this case, the individual mask plates 31 and 35 are driven in opposite directions in a synchronized manner along the direction, indicated by an arrow Hw, of the width of the slits. This makes it possible to adjust the aperture width of the slits with their centers kept in fixed positions relative to the individual lens cells 6a of the second lens array 6.

The aperture width is adjusted according to the brightness outside the display optical apparatus. That is, when an image is projected using the display optical apparatus of this embodiment, the aperture width of the slits is varied according to the brightness in the room in which the display optical apparatus is used. That is, when it is comparatively bright in the room, the aperture width of the slits is made larger to make the projected image brighter, and, when it is comparatively dim in the room, the aperture width of the slits is made smaller to obtain higher color purity and thus higher image quality. Alternatively, the aperture width may be adjusted to and fixed at a standard width before the shipment of the display optical apparatus.

The mask plates are driven, for example, by detecting the ambient brightness with a sensor (not shown) provided in the display optical apparatus and feeding back the detection result to control a motor or the like (not shown); alternatively, they may be driven manually by the user while viewing the projected image. Arrangements that employ a mask plate or mask plates as described above may be adopted also in the first and second embodiments described earlier; in that case, the integrator optical system and the dichroic mirror needs to be interchanged.

Figure 32:
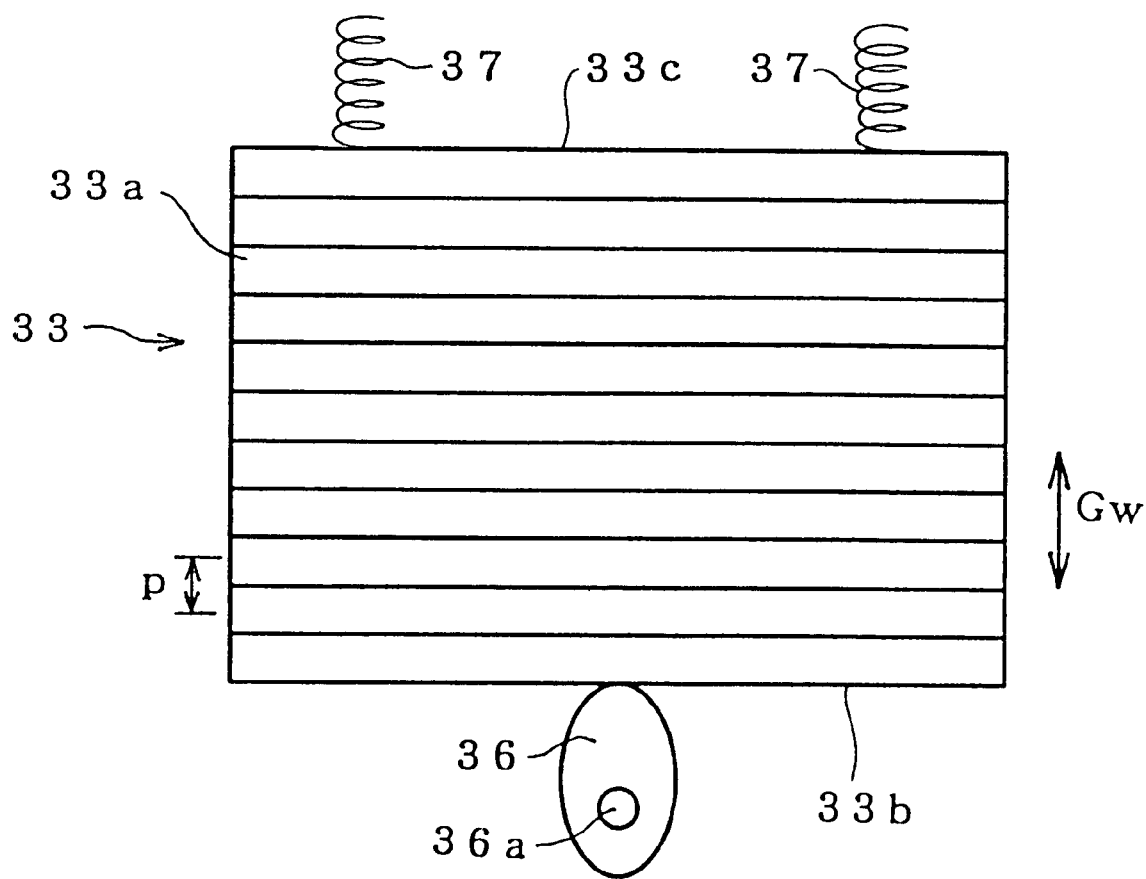
FIG. 32 is a diagram schematically showing an example of driving the microcylinderlens array in reciprocating motion.

Now, how the microcylinderlens array 33 is driven will be described. FIG. 32 schematically shows how the microcylinderlens array is driven in reciprocating motion. In the figure, the microcylinderlens array 33 is illustrated as seen along the optical axis. A cam 36 is kept in contact with the microcylinderlens array 33, near the center of one side 33b thereof that extend along the longer sides of the individual microcylinderlenses 33a. The opposite side of the microcylinderlens array 33 is kept pressed by, for example, a spring 37 so that the microcylinderlens array 33 is pressed against the cam 36.

As the cam 36 rotates about its axis 36a, since the cam 36 is decentered, the microcylinderlens array 33 is driven in reciprocating motion in the direction indicated by an arrow Gw through a distance that corresponds to the pitch p with which the microcylinderlenses 33a are arranged. This permits the illumination light to be shifted on the display panel (not shown here).

Figure 33:
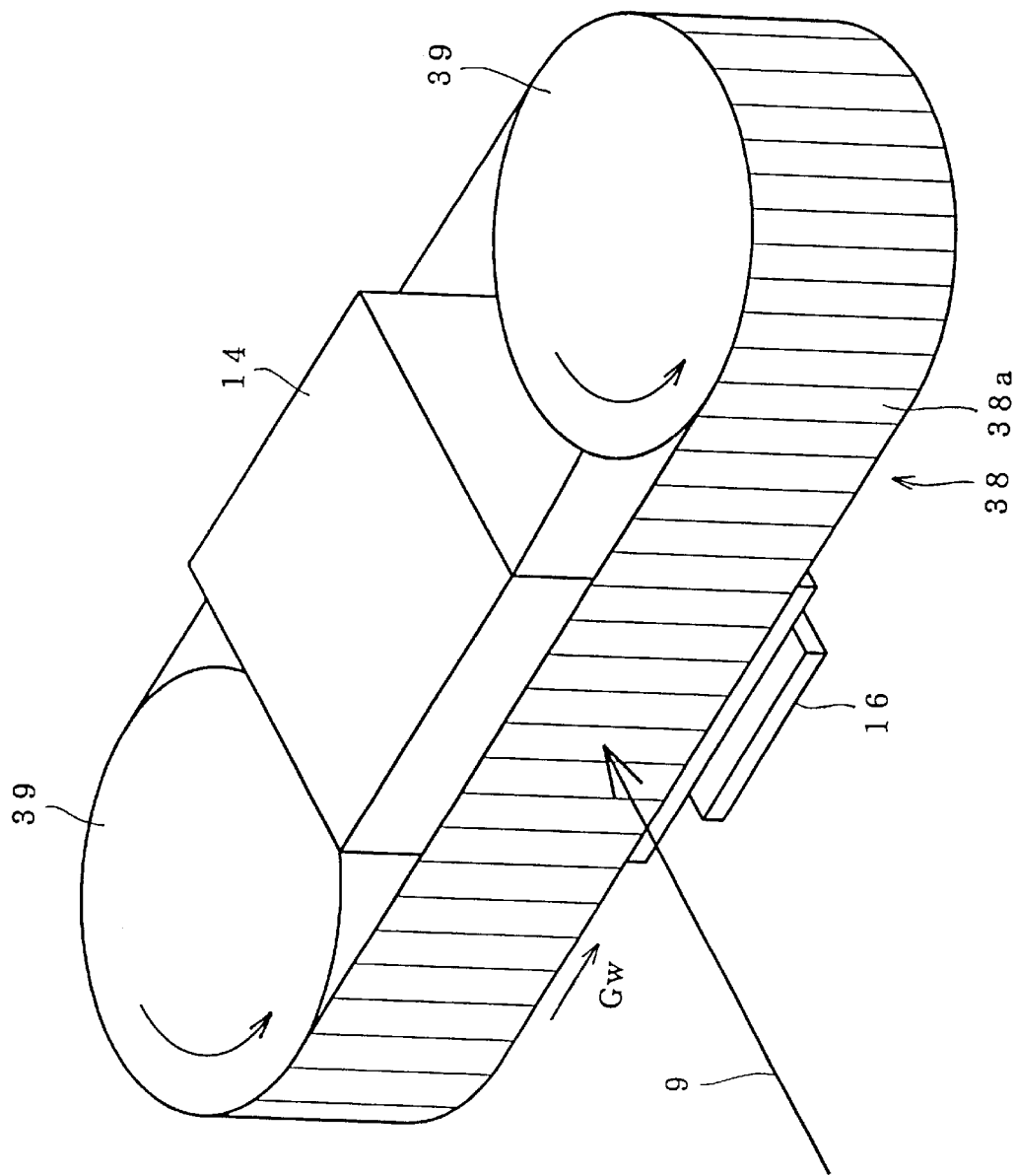
FIG. 33 is a diagram schematically showing an example of driving the microcylinderlens array in continuous motion.

FIG. 33 is a perspective view showing an example in which the microcylinderlenses are driven in continuous motion. Here, a number of microcylinderlenses 38a are linked together in the shape of a closed belt. This is led a microcylinderlens group 38. The microcylinderlens group 38 is mounted around two pivoted pulleys 39, with the PBS prism 14 disposed between these pulleys 39. As the pulleys 39 are rotated in the direction indicated by arrows by, for example, a motor (not shown), the microcylinderlens group 38 rotates, and thereby the microcylinderlenses 38a are driven continuously in the direction indicated by an arrow Gw in which they are arranged.

Meanwhile, when the light 9 is, along the optical axis indicated by an arrow, shone on the microcylinderlens group 38, it travels through the microcylinderlenses 38a to the PBS prism 14, and is then reflected therefrom so as to illuminate the display panel 16 disposed below. Thus, the illumination light is shifted continuously on the display panel 16. The positional relationship between the microcylinderlenses, the PBS prism, and the display panel shown here is somewhat different from that shown in FIG. 24.

What is claimed is:

1. A display optical apparatus comprising:
    an illumination optical system, including a color separator, for emitting, as illumination light, light polarized uniformly in a predetermined polarization direction after separating it by the color separator in such a way that light components of different wavelength ranges travel in different directions;
    a light modulating device having a display surface on which an optical image to be illuminated with the illumination light is displayed, the display surface being composed of pixels corresponding to three primary colors, namely R, G, and B, arranged in a recurring pattern;
    a projection optical system for focusing projection light exiting from the light modulating device on an image plane; and
    pixel shifting means for shifting the projection light focused on the image plane by a predetermined number of pixels at a time,
    wherein the illumination light is composed of light beams of three primary colors, namely R, G, and B, arranged in a recurring pattern, with light beams of identical colors illuminating a plurality of adjacent pixels of corresponding colors on the display surface of the light modulating device.

2. A display optical apparatus as claimed in claim 1, wherein the pixel shifting means is provided in the illumination optical system.

3. A display optical apparatus as claimed in claim 2, wherein the illumination optical system includes a microlens array or microcylinderlens array having lenses arranged one for each group of pixels illuminated with a group of light beams of three primary colors, namely R, G, and B, of the illumination light.

4. A display optical apparatus as claimed in claim 3, wherein the pixel shifting means performs pixel shifting in a direction parallel to a display surface of the microlens array or microcylinderlens array.

5. A display optical apparatus as claimed in claim 1, wherein the pixel shifting means performs pixel shifting in a direction parallel to a display surface of a lens included in the illumination optical system.

6. A display optical apparatus as claimed in claim 1, wherein the pixel shifting means performs pixel shifting in a direction parallel to a display surface of a lens included in the projection optical system.

7. A display optical apparatus as claimed in claim 1, wherein the pixel shifting means shifts the projection light in such a way that pixels of identical colors at different spots are superimposed on one another within one frame of an image displayed.

8. A display optical apparatus as claimed in claim 1, wherein the pixel shifting means shifts the projection light in such a way that pixels of identical colors at different spots are superimposed on one another from one frame to a next of an image displayed.

9. A display optical apparatus as claimed in claim 1, wherein the pixel shifting means controls the projection light by shifting the projection light one pixel at a time and turning on/off the pixels of the light modulating device in a combined manner.

10. A display optical apparatus as claimed in claim 9, wherein the pixel shifting means, when shifting the projection light one pixel at a time, controls shades of the projection light on a basis of intensity distribution of the illumination light on the display surface in combination with on/off states of the pixels of the light modulating device.

11. A display optical apparatus as claimed in claim 1, wherein the light modulating device is a reflection-type display panel.

12. A display optical apparatus as claimed in claim 11, wherein the light modulating device is a reflection-type display panel and has an illumination/projection separation optical system for separating the illumination light and the projection light.

13. A display optical apparatus as claimed in claim 12, wherein the illumination/projection separation optical system is a total-reflection prism.

14. A display optical apparatus as claimed in claim 12, wherein the illumination/projection separation optical system is a polarized-beam splitter.

15. A display optical apparatus comprising:
    an illumination optical system for separating light from a light source so that light components of different wavelength ranges travel in different directions, and for shining the thus separated light as illumination light on a display panel; and
    a projection optical system for projecting projection light emanating from the display panel while shifting the projection light by one or more pixels at a time,
    wherein the illumination light has R, G, and B light beams arranged alternately and recurrently, and each single light beam illuminates a plurality of consecutive pixels on the display panel.

16. A display optical apparatus as claimed in claim 15, wherein the illumination optical system has a microlens array or microcylinderlens array of which each lens element corresponds to a group of pixels illuminated by three consecutive R, G, and B light beams.

17. A display optical apparatus as claimed in claim 15, wherein the projection light from the display panel is projected while being shifted such that pixels of identical colors at different locations overlap within a single frame.

18. A display optical apparatus as claimed in claim 15, wherein the projection light from the display panel is projected while being shifted such that pixels of identical colors at different locations overlap between consecutive frames.

19. A display optical apparatus as claimed in claim 15, wherein the projection light from the display panel is projected while being shifted by one pixel at a time, and information is displayed by combining pixels that are turned on at particular locations projected.

20. A display optical apparatus as claimed in claim 19, wherein gradations are produced by determining which pixels to turn on according to differences in intensity distribution among groups of a plurality of pixels of each color.

21. A display optical apparatus comprising:
    an illumination optical system for separating light from a light source so that light components of different wavelength ranges travel in different directions, and for shining the thus separated light as illumination light on a display panel while shifting the light continuously or a fine pitch at a time; and
    a projection optical system for projecting projection light emanating from the display panel, wherein the illumination light has R, G, and B light beams arranged alternately and recurrently, and each single light beam illuminates a plurality of consecutive pixels on the display panel.

22. A display optical apparatus as claimed in claim 21, wherein the illumination optical system has a microcylinderlens array of which each lens element images the separated illumination light on the display panel so that light components of different wavelength ranges are imaged at different locations thereon.

23. A display optical apparatus as claimed in claim 21, wherein information is displayed by combining time zones in which particular pixels are turned on among the pixels illuminated.

24. A display optical apparatus as claimed in claim 23, wherein gradations are produced by determining the time zones in which the pixels are turned on according to time-related variations in strength distribution of each color component of the illumination light.

25. A display optical apparatus as claimed in claim 21, wherein the display panel is a reflective panel, an illumination/projection separation optical system for separating the illumination light and the projection light is provided, a microlens array or microcylinderlens array is disposed on the illumination light incident side of the illumination/projection separation optical system, and the illumination light is shifted by driving the microlens array or microcylinderlens array.

26. A display optical apparatus as claimed in claim 25, wherein a color separation optical system for separating the light from the light source so that light components of different wavelength ranges travel in different directions is disposed immediately in front of the microlens array or microcylinderlens array.

27. A display optical apparatus as claimed in claim 25, wherein the illumination/projection separation optical system is a prism that totally reflects the illumination light and thereby directs the illumination light to the display panel, and that transmits the projection light from the display panel and thereby directs the projection light to the projection optical system.

28. A display optical apparatus as claimed in claim 25, wherein the illumination/projection separation optical system is a polarization beam splitter.

\* \* \* \* \*